US009235874B2

(12) United States Patent
Voronov et al.

(10) Patent No.: US 9,235,874 B2
(45) Date of Patent: Jan. 12, 2016

(54) IMAGE PROCESSOR FOR AND METHOD OF UPSCALING AND DENOISING USING CONTEXTUAL VIDEO INFORMATION

(71) Applicant: SAMSUNG ELECTRONICS CO., LTD., Suwon-si, Gyeonggi-do (KR)

(72) Inventors: German Voronov, Holon (IL); Shai Litvak, Hashmonai (IL); Tomer Yanir, Monosson (IL); Leonid Brailovsky, Herzliya (IL)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 171 days.

(21) Appl. No.: 14/067,409

(22) Filed: Oct. 30, 2013

(65) Prior Publication Data

US 2014/0301661 A1 Oct. 9, 2014

(30) Foreign Application Priority Data

Apr. 8, 2013 (KR) ........................ 10-2013-0038165

(51) Int. Cl.
*G06K 9/40* (2006.01)
*G06T 3/40* (2006.01)
(Continued)

(52) U.S. Cl.
CPC ............... *G06T 3/4053* (2013.01); *G06T 5/002* (2013.01); *G06T 5/50* (2013.01); *G06T 2207/10016* (2013.01); *G06T 2207/20021* (2013.01); *G06T 2207/20182* (2013.01)

(58) Field of Classification Search
None
See application file for complete search history.

(56) References Cited

U.S. PATENT DOCUMENTS 5,828,848 A * 10/1998 MacCormack et al. ...... 709/247
7,352,918 B2 4/2008 Tannhof et al.
(Continued)

FOREIGN PATENT DOCUMENTS

| JP | 2006-050352 | 2/2006 |
|----|-------------|--------|
| JP | 2010-041571 | 2/2010 |
| KR | 1020080044693 | 5/2008 |

OTHER PUBLICATIONS

Freeman, W. T., Jones, T. R., Pasztor, E. C., "Example based super-resolution", IEEE Comput. Graph. Appl. Mar./Apr. 2002, pp. 56-65.
(Continued)

*Primary Examiner* — Eueng-Nan Yeh
(74) *Attorney, Agent, or Firm* — F. Chua & Associates, LLC

(57) ABSTRACT

High quality upscaling and denoising are required in mobile imaging devices that do not contain high quality lenses. Such is also required in order to scale up standard-definition video content for display in high-definition television screens.
The disclosed method uses contextual information obtained during upscaling and/or denoising of frames. Relevant correspondences between patches within a frame and between frames, are detected, managed and exploited. The correspondence information is simultaneously used and updated while video frames are being processed. Two approaches may be used: 1. keeping, searching for and updating a database of useful patches, by adding frequently visible similar patches, aggregating high-frequency, low-noise information associated with the similar patches, and removing less-observed patches; 2. Using the high-resolution and noise-reduced information that was collected from earlier video frames, and is expressed by the output of latest processed frame, for upscaling and/or noise-reducing the next processed frame.

18 Claims, 23 Drawing Sheets

(51) Int. Cl.
*G06T 5/00* (2006.01)
*G06T 5/50* (2006.01)

(56) References Cited

U.S. PATENT DOCUMENTS

| | | |
|---|---|---|
| 8,165,197 B2 | 4/2012 | Douma et al. |
| 8,374,465 B2 | 2/2013 | Mertens |
| 8,411,940 B2 | 4/2013 | Dauw et al. |
| 2008/0231755 A1 | 9/2008 | Suba |
| 2011/0081094 A1 | 4/2011 | Damkat |
| 2013/0028538 A1* | 1/2013 | Simske et al. ............ 382/300 |

OTHER PUBLICATIONS

Yang J., Wright J., Huang T., Ma Y. "Image Super-resolution via Sparse Representation", IEEE Transactions on Image Processing (TIP), pp. 2861-2873, vol. 19, issue 11, May 2010.

DongW., Zhang L., ShiG., Wu X. "Image deblurring and super-resolution by adaptive sparse domain selection and adaptive regularization", IEEE Transactions on Image Processing, vol. PP, No. 99, pp. 1-35, Jan. 2011.

Glasner, D., Bagon, S., Irani, M. 2009. "Super-resolution from a single image", In ICCV09. pp. 349-356, (published before this application Oct. 2013).

Hyeongkoo Lee, Tae-Chan Kim. "Local Self-Similarity Based Backprojection for Image Upscaling", pp. 1215-1218, ISCAS 2012, (published before this application Oct. 2013).

IraniM. and Peleg S., "Super Resolution From Image Sequences", ICPR, 2:115-120, Jun. 1990.

Pickup L., Roberts S., Zisserman A., "Optimizing and Learning for Super-resolution", BMVC 2006, Sep. 4-7, 2006, Edinburgh, UK.

Muja M, Lowe D. G. 2009. "Fast Approximate Nearest Neighbors with Automatic Algorithm Configuration", in International Conference on Computer Vision Theory and Applications (VISAPP'09), (published before this application Oct. 2013).

Szeliski R, 2006. "Image alignment and stitching: A tutorial", Foundations and Trends in Computer Graphics and Computer Vision, 2(1):1-104, Dec. 2006.

Freedman G. and Fattal R. 2010, "Image and Video Upscaling from Local Self-Examples", ACM Transactions on Graphics, pp. 1-11,SIGGRAPH 2011, (published before this application Oct. 2013).

Farsiu, S., Robinson, M., Elad, M., Milanfar, P. 2004. "Fast and robust multiframe super resolution", Image Processing, IEEE Transactionson 13, 10 (Oct.), 1327-1344.

* cited by examiner

| Patches | Descriptor | High frequency components | Score |
|---|---|---|---|
| 1 | | | |
| 2 | | | |
| ⋮ | | | |
| n | | | |

Fig. 20

Pointer based Management

| Patches | Pointer to specific location | Pointer to frame | Frame |
|---------|------------------------------|------------------|-------|
| 1 | | | |
| 2 | | | |
| ⋮ | | | |
| n | | | |

Contents based Management

| Patches | Contents |
|---------|----------|
| 1 | |
| 2 | |
| ⋮ | |
| n | |

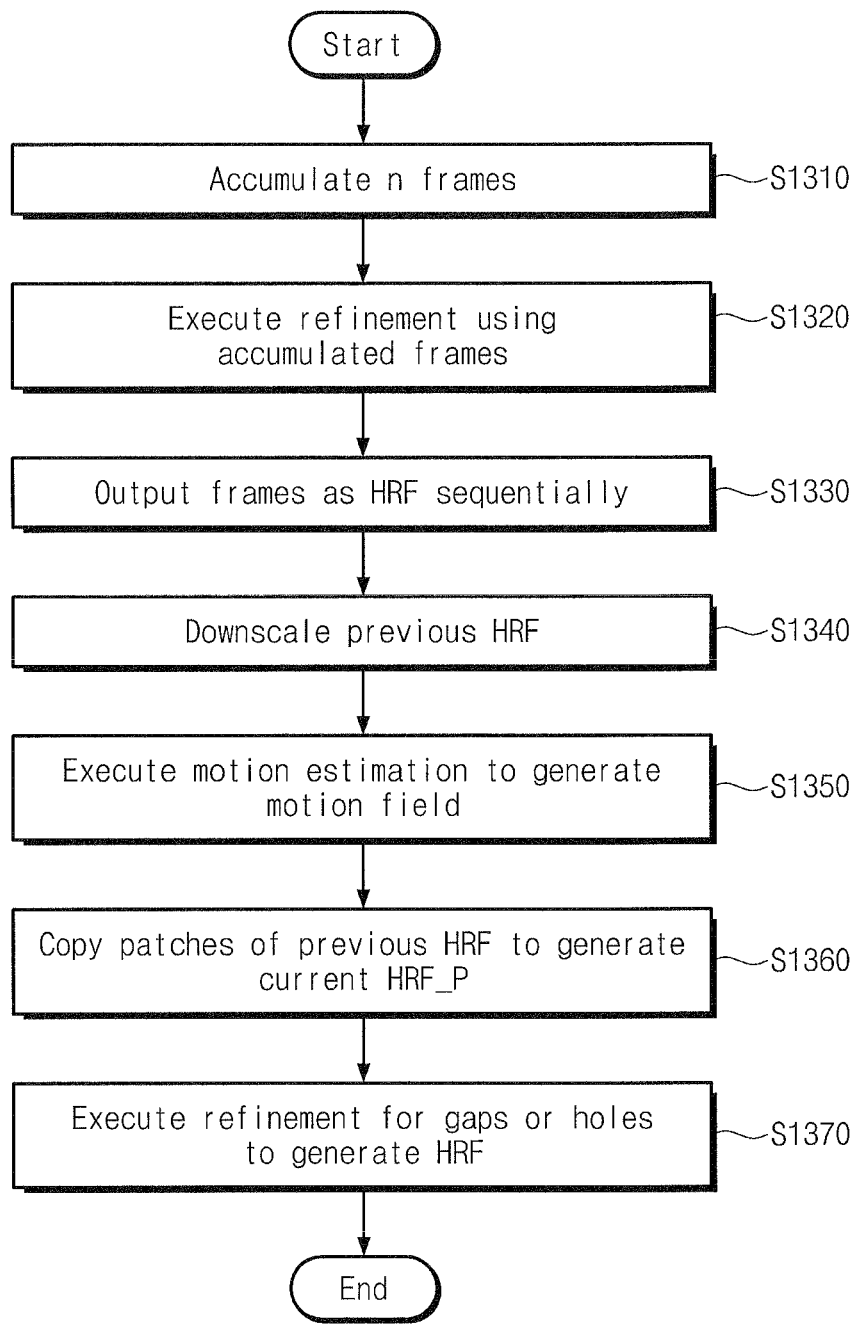

IMAGE PROCESSOR FOR AND METHOD OF UPSCALING AND DENOISING USING CONTEXTUAL VIDEO INFORMATION

CROSS-REFERENCE TO RELATED APPLICATIONS

This application claims priority under 35 U.S.C. §119 to Korean Patent Application No. 10-2013-0038165 filed on Apr. 8, 2013, the disclosure of which is incorporated by reference in its entirety.

1. Technical Field

The inventive concept described herein relates to a semiconductor device, and more particularly, relate to an image processor and an image processing method of the image processor.

1. Discussion of the Related Art

As mobile image processing techniques and image processing devices are developed, images may be widely utilized in mobile devices such as smartphones, tablets and other consumer electronics devices. Images may be used to visually provide information to a user, and may have a higher effectiveness compared with typical texts and voice. Images may be captured by image sensors such as a CMOS image sensor, a CCD image sensor, and so on.

The quality (e.g., resolution) of an image captured through an image sensor generally depends upon the resolution and performance of the image sensor. While a high-performance image sensor captures an image with the high quality, its inclusion in a mobile device may cause an increase in the manufacturing cost.

SUMMARY OF THE INVENTIVE CONCEPT

An aspect of the inventive concept prevent an increase in the manufacturing cost, while enabling high-quality images to be acquired using a low-quality image captured by a low-priced image sensor. In particular, exemplary embodiments of an image sensor used in a mobile device according an exemplary embodiment of the inventive concept may have characteristics such as a small size, a light weight, low power consumption. An aspect of the inventive concept provides a technique capable of acquiring high-quality images using a low-quality image acquired through a low-priced, light, small, low-power image sensor. An aspect of the inventive concept is directed to provide an image processor capable of acquiring high-quality images from low-quality images with the improved reliability and accuracy and an image processing method thereof.

One aspect of the inventive concept is directed to provide an image processing method of an image processor that comprises upscaling an input frame based on a patch dictionary unit including a plurality of patches being frame fragments, the size of each frame fragment being smaller than that of a frame; updating the patch dictionary unit according to an upscale result, wherein at upscaling of the input frame, a high frequency component of the upscaled frame is reinforced based on the patch dictionary unit.

In an exemplary embodiment, the patch dictionary unit is updated based on at least one patch used at the upscaling.

In an exemplary embodiment, the upscaling an input frame comprises selecting a magnified patch of the upscaled input frame; detecting a descriptor indicating a low frequency component of the magnified patch from the magnified patch; searching for a first patch in a relevant area of the input frame based on the descriptor; searching for a second descriptor in the patch dictionary unit based on the descriptor, and modifying the magnified patch using one, closer to the magnified patch, from among the first and second patches.

In an exemplary embodiment, the updating the patch dictionary unit according to an upscale result comprises calculating similarity/difference between the first patch and the second patch; and updating the patch dictionary unit with the first patch or ignoring the first patch according to the calculated similarity/difference.

In an exemplary embodiment, the updating the patch dictionary unit according to an upscale result comprises calculating the difference between the first patch and the second patch; replacing the second patch stored in the patch dictionary unit with the first patch if the calculated difference is less than a threshold value; determining whether the first patch is closer to the magnified patch than the second patch (i.e., determining whether the difference between the first patch and the magnified patch is less than the difference between the second patch and the magnified patch), if the calculated difference is not less than a threshold value; adding the first patch to the patch dictionary unit if the first patch is closer to the magnified patch than the second patch; and ignoring the first patch if the first patch is not closer to the magnified patch than the second patch.

In an exemplary embodiment, the updating the patch dictionary unit according to an upscale result further comprises increasing the score of a patch, used at the upscaling, from among patches stored in the patch dictionary unit; assigning a predetermined score to a new patch if the new patch is added to the patch dictionary unit; and decreasing the scores of patches stored in the patch dictionary unit if the predetermined number of search operations is executed at the patch dictionary unit.

In an exemplary embodiment, the updating the patch dictionary unit according to an upscale result further comprises deleting a patch, having a score lower than a threshold value, from among patches stored in the patch dictionary unit after the scores are decreased.

In an exemplary embodiment, the updating the patch dictionary unit according to an upscale result further comprises deleting a patch, having a score lower than a threshold value, from among patches stored in the patch dictionary unit if the size of the patch dictionary unit reaches a predetermined limit value upon adding of a new patch to the patch dictionary unit.

In an exemplary embodiment, the updating the patch dictionary unit according to an upscale result further comprises combining a new patch and similar patches if the number of the similar patches, similar to the new patch, from among patches stored in the patch dictionary unit is larger than a threshold value upon adding of the new patch to the patch dictionary unit.

In an exemplary embodiment, if the patch dictionary unit is initialized, remaining patches other than baseline patches are deleted from the patch dictionary unit.

In an exemplary embodiment, the upscaling an input frame comprises selecting a magnified patch of the upscaled input frame; searching for at least one first patch similar to the magnified patch in a relevant area of the upscaled input frame; searching for a second patch similar to the magnified patch in the patch dictionary unit; executing refinement using the at least one first patch and the second patch; and replacing the magnified patch with the refined patch.

In an exemplary embodiment, the updating the patch dictionary unit according to an upscale result comprises updating the patch dictionary unit with the at least one first patch if the second patch is not searched for.

In an exemplary embodiment, the updating the patch dictionary unit according to an upscale result comprises increasing the score of the second patch if the second patch is searched for at the patch dictionary unit; adding the at least one first patch to the patch dictionary unit with a first initial score if the second patch is not searched for in the patch dictionary unit and the at least one first patch is searched for; and adding the magnified patch to the patch dictionary unit with a second initial score smaller than the first initial score if the second patch is not searched for in the patch dictionary unit and the at least one first patch is not searched for.

In an exemplary embodiment, the image processing method further comprises downscaling a previous frame upscaled; generating a motion field by performing motion detection on the downscaled frame and the input frame; and generating a partially upscaled frame by copying patches of the previous frame upscaled, based on the motion field, wherein the upscaling is executed with respect to the partially upscaled frame.

In an exemplary embodiment, the updating the patch dictionary according to an upscale result comprises adding frequently visible similar patches in upscaled frames to the patch dictionary unit; aggregating high-frequency and low-noise information associated with the plurality of patches in the patch dictionary unit; and removing less-observed patches in the upscaled frames from the patch dictionary unit.

In an exemplary embodiment, the upscaling an input frame based on a patch dictionary unit comprises upscaling or noise-reducing the input frame using the high-frequency and low-noise information which are collected from a plurality of previous input frames.

One aspect of the inventive concept is directed to provide an image processor which comprises a patch dictionary unit for storing a plurality of patches being frame fragments, the size of each frame fragment being smaller than the size of a frame; an upscale unit configured to receive an input frame, upscale the input frame, and to reinforce a high frequency component of the upscaled frame referring to the input frame and the patch dictionary unit; and a dictionary management unit configured to update the patch dictionary unit based on the patches used by the upscale unit.

In an exemplary embodiment, the image processor further comprises a patch refinement unit configured to execute refinement of a patch of the upscaled input frame and a patch of the patch dictionary unit searched for by the upscale unit, and wherein the upscale unit executes an upscale on the input frame using the refined patches and the dictionary management unit updates the patch dictionary unit based on the refined patches.

In an exemplary embodiment, the image processor further comprises a downscale unit configured to downscale an output frame of the upscale unit; a motion estimation unit configured to perform motion estimation using a frame downscaled by the downscale unit and an initial input frame; and a motion compensation unit configured to generate a partially upscale frame by copying patches of the output frame based on a motion field estimated by the motion estimation unit, the partially upscale frame being sent to the upscale unit as the input frame.

One aspect of the inventive concept is directed to provide an image processor comprising: a motion estimation unit configured to perform motion estimation using a first upscaled-then-downscaled frame output by a downscale unit and an upscale unit and second initial input frame; and a motion compensation unit configured to generate a partial frame by copying patches of the first upscaled-then-downscaled frame based on a motion field estimated by the motion estimation unit, the partial frame being sent to the upscale unit.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions and/or sections, these elements, components, regions and/or sections should not be limited by these terms. These terms are only used to distinguish one element, component, region or section from another region or section. Thus, a first element, component, region, or section discussed below could be termed a second element, component, region or section without departing from the teachings of the inventive concept. The terminology used herein is for the purpose of describing particular embodiments only and is not intended to be limiting of the inventive concept. As used herein, the singular forms "a", "an" and "the" are intended to include the plural forms as well, unless the context clearly indicates otherwise. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

BRIEF DESCRIPTION OF THE FIGURES

The above and other features will become apparent from the following description with reference to the following figures, wherein like reference numerals refer to like parts throughout the various figures unless otherwise specified, and wherein:

FIG. 20 shows tables for describing an example in which patches stored in a patch dictionary unit are managed;

FIG. 26 is a flow chart illustrating an image processing method of the image processor of FIG. 24 according to an embodiment of the inventive concept.

DETAILED DESCRIPTION OF EXEMPLARY EMBODIMENTS

Figure 1:
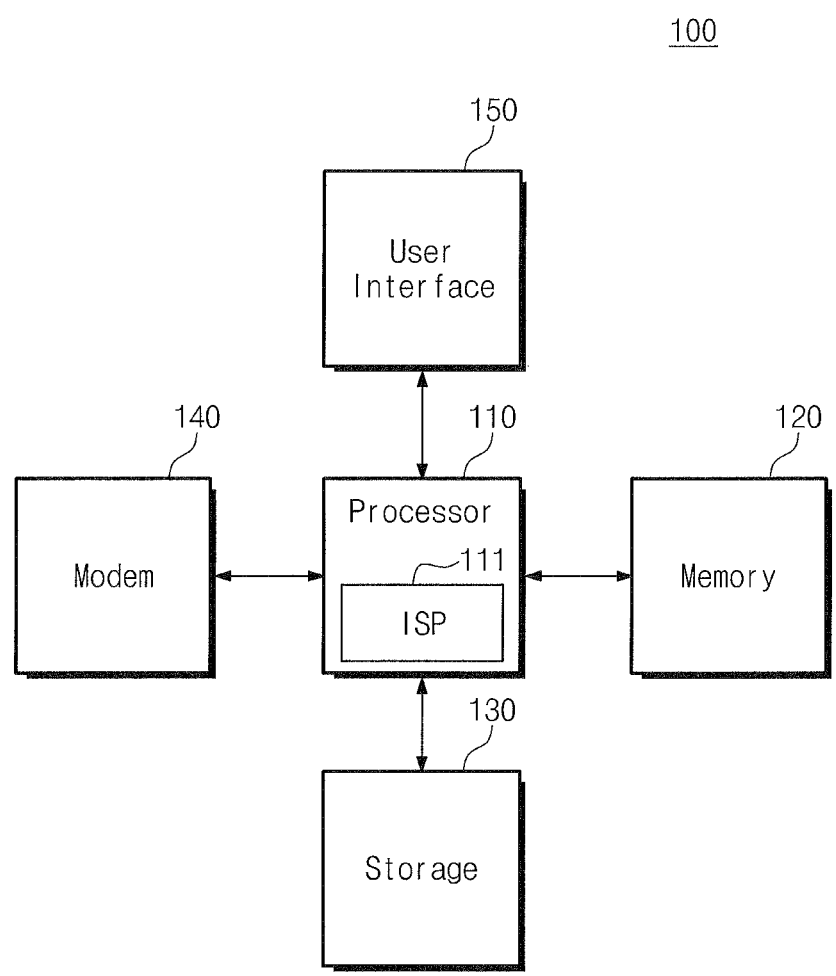
FIG. 1 is a block diagram of a computing device including an image processor according to an embodiment of the inventive concept.

FIG. 1 is a block diagram of a computing device 100 including an image processor according to an exemplary embodiment of the inventive concept. Referring to FIG. 1, a computing device 100 includes a processor 110, a memory 120, storage 130, a modem 140, and a user interface 150.

The processor 110 controls the overall step of the computing device 100, and performs logic and calculations. For example, the processor 110 may be a system-on chip (SoC). The processor 110 may be a general purpose processor, an application processor, or a specific purpose processor.

The processor 110 may include an image processor 111. The image processor 111 is configured to process images. The image processor 111 may receive and process low-resolution images to output high-resolution images. The image processor 111 can be formed of an intellectual property (IP) known to persons skilled in the art.

The memory 120 is accessed by the processor 110. The memory 120 may be a working memory (or, a main memory) of the processor 110 or of the computing device 100. The memory 120 may include volatile memories such as a static RAM (SRAM), a dynamic RAM (DRAM), a synchronous DRAM (SDRAM), and so on and/or nonvolatile memories such as a flash memory, a phase change RAM (PRAM), a magnetic RAM (MRAM), a resistive RAM (RRAM), a ferroelectric RAM (FRAM), and so on.

In an exemplary embodiment, the memory 120 and the storage 130 may be formed of the same type of nonvolatile memories. In this case, the memory 120 and the storage 130 may be integrated to one semiconductor integrated circuit.

The modem 140 may communicate with an external device according to the control of the processor 110. For example, the modem 140 may perform wire or wireless communication with the external device. The modem 140 may perform communications based on at least one of various wireless communications manners such as LTE (Long Term Evolution), WiMax, GSM (Global System for Mobile communication), CDMA (Code Division Multiple Access), Bluetooth, NFC (Near Field Communication), WiFi, RFID (Radio Frequency IDentification), and so on or various wire communications manners such as USB (Universal Serial Bus), SATA (Serial AT Attachment), SCSI (Small Computer Small Interface), Firewire, PCI (Peripheral Component Interconnection), and so on.

The user interface 150 may communicate with a user according to the control of the processor 110. For example, the user interface 150 may include user input interfaces such as a keyboard, a keypad, a button, a touch panel, a touch screen, a touch pad, a touch ball, a camera, a microphone, a gyroscope-equivalent sensor, a vibration sensor, and so on. The user interface 150 may include user output interfaces such as an LCD (Liquid Crystal Display), an OLED (Organic Light Emitting Diode) display device, an AMOLED (Active Matrix OLED) display device, a beam projector, an LED, a speaker, a motor, solenoid, and so on.

The computing device 100 may be a mobile device such as a smart phone, a smart pad, a smart camera, or the like. The computing device 100 may be a device such as a smart television, a computer, a notebook computer, a netbook, or the like.

The image processor 111 according to an exemplary embodiment of the inventive concept provides two functions. One function is a frame generation. The image processor 111 takes current frame and upscales and denoises it using a patch dictionary. Another function is a patch dictionary management for managing the patch dictionary. The image processor 111 updates the patch dictionary by new information from the current frame. Those two functions are performed in parallel, and thus, the updating of the patch dictionary is performed online (or on-the fly) manner. The two functions are described referring four examples.

A first exemplary embodiment upscales an input frame to output a magnified frame. The first exemplary embodiment searches patches from the patch dictionary and the input frame, and modify high frequency components of a magnified patch using the searched for patches. The patch dictionary is updated based on a patch used at the magnifying. The first exemplary embodiment is described referring FIG. 2 through FIG. 15.

A second exemplary embodiment searches for patches from a patch dictionary and a magnified frame. The second exemplary embodiment restores high frequency components of a magnified patch by aligning similar patches of the same scale. The patch dictionary is updated based on a result of the aligning. Variations of the first exemplary embodiment can be applied to obtain a second, third, and fourth exemplary embodiment. The second exemplary embodiment is described referring to FIG. 16 through FIG. 21.

A third exemplary embodiment takes advantage of high correlation between frames. A high resolution output of a previous frame is used to generate a high resolution output of a current frame using hybrid techniques such as a motion compensation, a gap filling, etc. The third exemplary embodiment reconstructs the high resolution current frame using the motion compensation, and executes a patch search and a patch dictionary management at gaps. The third exemplary embodiment is described referring to FIG. 22 and FIG. 23.

A fourth exemplary embodiment combines the second exemplary embodiment and the third exemplary embodiment. The fourth exemplary embodiment restores gaps by aligning patches of the same scale. The fourth exemplary embodiment is described referring to FIG. 24 through FIG. 26.

Examples of the inventive concept can update the patch dictionary by adding frequently visible similar patches in pre-processed upscaled frames to the patch dictionary, aggregate high-frequency and now-noise information associated with patches in the patch dictionary, and remove less-observed patches in the pre-processed upscaled frames from the patch dictionary. Furthermore, the examples of the inventive concept can upscale or noise-reduce an input frame using the high-frequency and low-noise information that are collected from a plurality of previous input frames.

Figure 2:
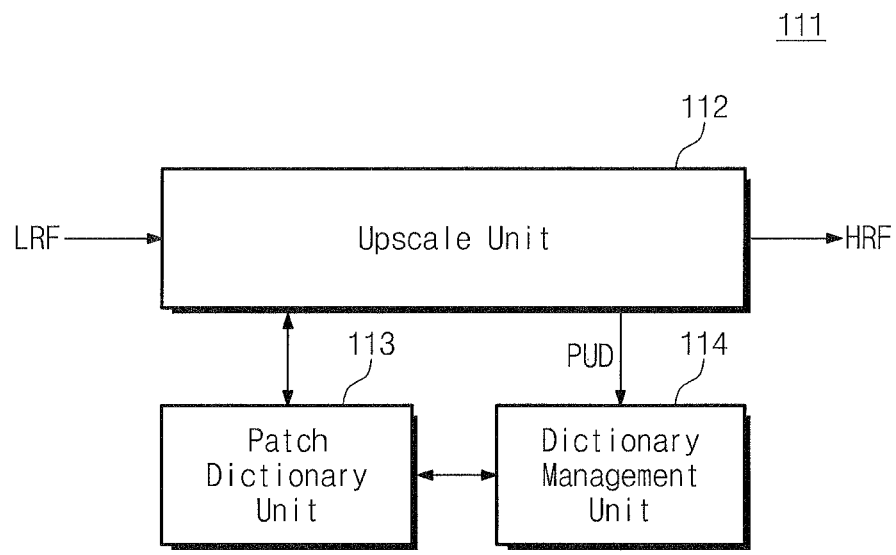
FIG. 2 is a block diagram of an image processor according to an exemplary embodiment of the inventive concept.

FIG. 2 is a block diagram of an image processor 111 according to an exemplary embodiment of the inventive concept. Referring to FIG. 2, an image processor 111 may include an upscale unit 112, a patch dictionary unit 113, and a dictionary management unit 114.

The upscale unit 112 may receive a low resolution frame (LRF). The upscale unit 112 can upscale the input frame LRF referring to the input frame LRF (or, an input image) and the patch dictionary unit 113. The upscale unit 112 can output the upscaled frame as a high resolution frame HRF.

The patch dictionary unit 113 can store a plurality of patches. The patches may be frame fragments each having a size less than the size of the input frame LRF and less than the size of the output frame HRF. The patch dictionary unit 113 may store predetermined baseline patches or patches acquired by learning.

The dictionary management unit 114 is configured to manage the patch dictionary unit 113. The dictionary management unit 114 receives patch-use data PUD from the upscale unit 112. The patch-use data PUD may include information about patches that are used during upscaling of the upscale unit 112. The dictionary management unit 114 manage the patch dictionary unit 113 based on the patch-use data PUD. For example, the dictionary management unit 114 can add patches to the patch dictionary unit 113, change patches stored in the patch dictionary unit 113, or delete patches stored in the patch dictionary unit 113.

In FIG. 2, there is illustrated an example in which the patch dictionary unit 113 is a component of the image processor 111. However, the inventive concept is not limited thereto. For example, the patch dictionary unit 113 may be provided at a computing device 100 without location limitations and performs as a storage medium in which a plurality of patches are stored. The patch dictionary unit 113 may be implemented in the storage 130 as a type of database.

Figure 3:
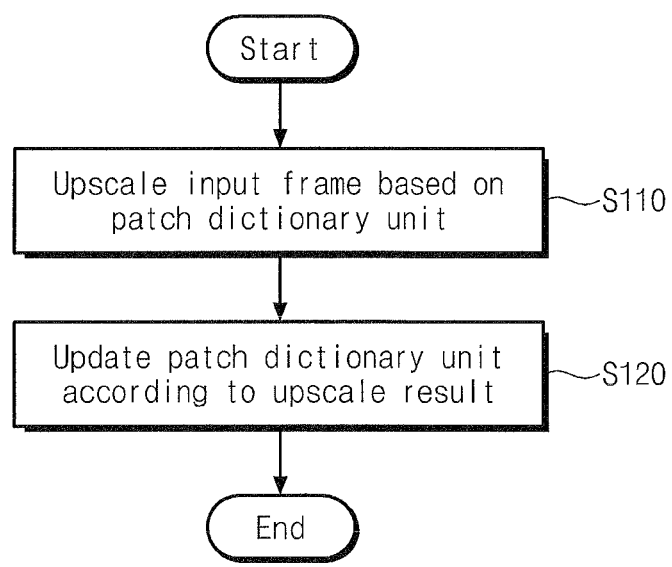
FIG. 3 is a flow chart illustrating an image processing method of the image processor of FIG. 2.

FIG. 3 is a flow chart illustrating an image processing method of an image processor 111 of FIG. 2. Referring to FIGS. 2 and 3, in step S110, an input frame LRF is upscaled based on a patch dictionary unit 113. For example, the input frame LRF is upscaled, and then high frequency components of the upscaled frame are restored based on previously-stored patches searched for in the patch dictionary unit 113 or the input frame LRF.

In step S120, a patch dictionary unit 113 updates according to an upscale result. The dictionary management unit 114 updates the patch dictionary unit 113 according to the upscale result. For example, the patch dictionary unit 113 may be updated using the searched for patches. The dictionary management unit 114 may update the patch dictionary unit 113 according to similarity between the searched for patches.

Figure 4:
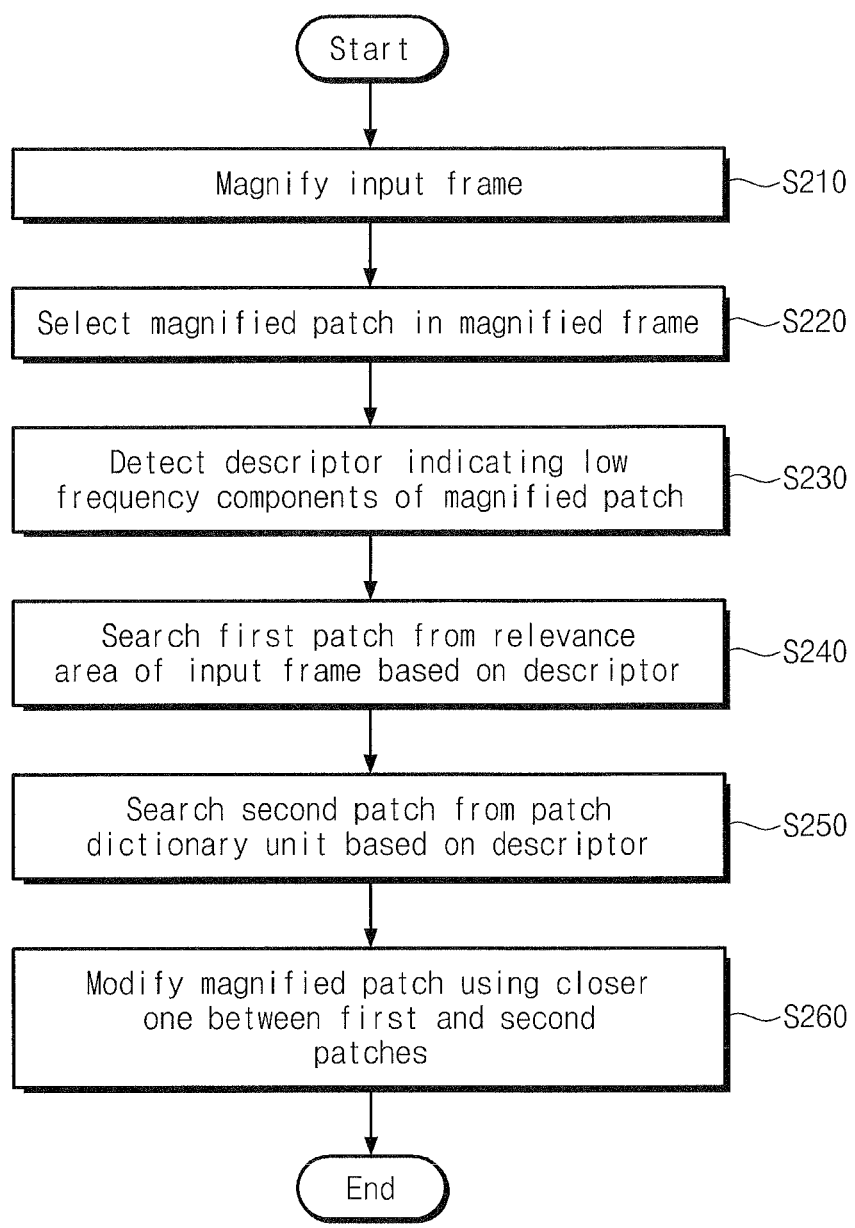
FIG. 4 is a flow chart of the upscale step in the method of FIG. 3.

FIG. 4 is a flow chart illustrating the upscale step (S110) in the method of FIG. 3. Referring to FIGS. 2 to 4, in step S210, an input frame LRF is magnified. For example, the input frame LRF may be magnified to have a size required by an output frame HRF. The input frame LRF may be magnified through simple interpolation such as bicubic. The magnified frame will have a size corresponding to the output frame HRF, not a resolution corresponding to the output frame HRF. The magnified frame may have a lesser amount of high frequency component compared with a low frequency component.

In step S220, a magnified patch in the magnified frame is selected.

Figure 5:
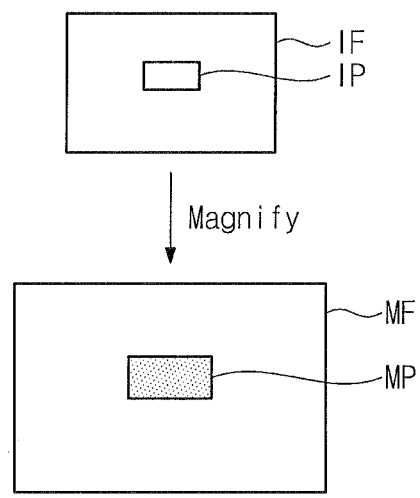
FIG. 5 is an exemplary frame for illustrating the performance of steps S210 and S220 of FIG. 4.

A process in which steps S210 and S220 are performed is illustrated in the example of FIG. 5. Referring to FIG. 5, an input frame IF, input patch IP, a magnified frame MF, and a magnified patch MP may be illustrated. The input patch IP may be a patch on the input frame IP and corresponds to the magnified patch MP.

Referring to FIGS. 2, 4, and 5, in step S230, a descriptor indicating a low frequency component of the magnified patch MP is detected. The descriptor is detected from the magnified patch MP. In an exemplary embodiment, the descriptor includes information about a low frequency component of a region including the magnified patch MP. An exemplary descriptor is disclosed in a paper (published by Jianchao Yang et als, 2010) entitled "IMAGE SUPER-RESULTION VIA SPARSE REPRESENTATION", (http://ieeexplore.ieee.org Digital Object Identifier: 10.1109/TIP.2010.2050625) the contents of which are incorporated by reference herein.

In step S240, a first patch is searched for from a relevant area of the input frame, based on the descriptor. For example, a patch having a characteristic similar to the descriptor may be searched for at the relevant area of the input frame.

In step S250, a second patch may be searched for in a patch dictionary unit 113 based on the descriptor. For example, there may be a search for a descriptor, similar to a calculated descriptor, from among patches stored in the patch dictionary unit 113. The patch dictionary unit 113 performs a search operation using one of various methods such as exhaustive search, tree-based search, hash-based search, index-based search, and so on. The patch dictionary unit 113 may be searched according to an ANN (Advanced approximate Nearest Neighbors Search) method or a search method in which an index is added to each area and the ANN and index-based search are combined. The ANN is disclosed in a paper (published by Marius Muja and David G. Lowe, 2009), entitled "FAST APPROXIMATE NEAREST NEIGHBORS WITH AUTOMATIC ALGORITHM CONFIGURATION", the contents of which are herein incorporated by reference.

Figure 6:
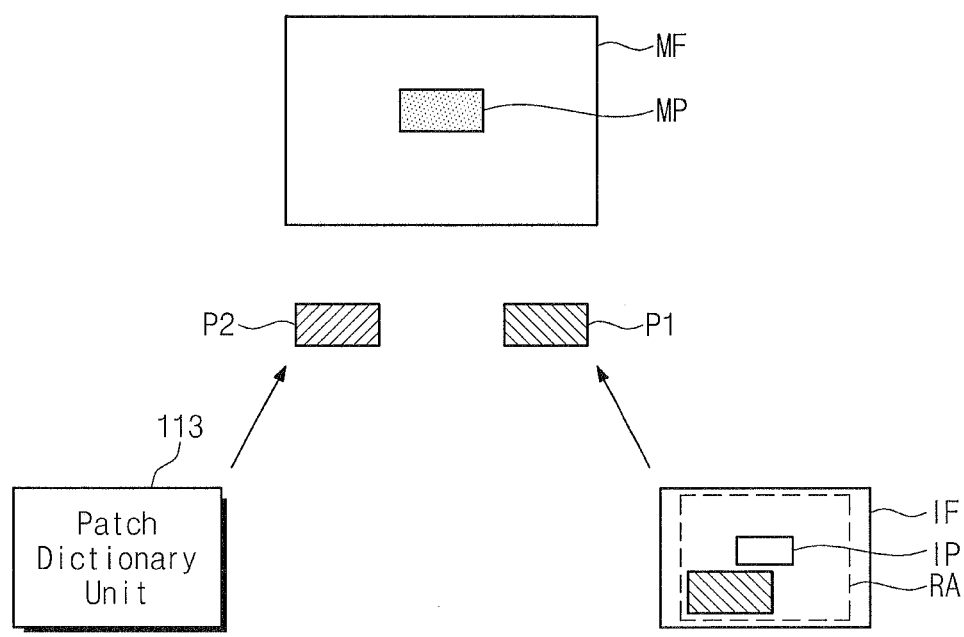
FIG. 6 is an exemplary frame for illustrating the performance of steps S240 and S250 of FIG. 4.

A process in which steps S240 and S250 are performed is illustrated in the example of FIG. 6. Referring to FIG. 6, a magnified frame MF, an input frame IF, and a patch dictionary unit 113 are illustrated.

The magnified frame MF includes the magnified patch MP.

The input frame IF is an original frame that becomes magnified. The input frame IF may include a relevant area RA. The relevant area RA may be an area including an input patch IP on the input frame IF corresponding to the magnified patch MP. The size of the relevant area RA may be less than that of the input frame IF or equal to that of the input frame IF. A first patch P1 having a characteristic similar to a descriptor of the magnified frame MP may be searched for at the relevant area RA. The descriptor of the magnified frame MP may include information about a low frequency component of the magnified patch MP, for example. Thus, the first patch P1 searched for at the relevant area RA may be a patch which has a low frequency component similar to the magnified patch MP. The size of the first patch P1 is equal to that of the magnified patch MP.

A second patch P2 may be searched for in the patch dictionary unit 113. Like the first patch P1, the second patch P2 searched for at the relevant area RA may be a patch which has a low frequency component similar to the magnified patch MP. The size of the second patch P2 is equal to that of the magnified patch MP.

Referring to FIGS. 2, 4, and 6, in step S260, the magnified patch MP is modified using the patch, closer to the magnified patch MP, selected from among the first and second patches P1 and P2. For example, the first patch P1 searched for in the input frame IF before magnification may include a high frequency component. The second patch P2 searched for in the patch dictionary unit 113 may include a high frequency component.

A high frequency component of the magnified patch MP may be reinforced using a high frequency component of a patch, closer to the magnified patch MP, selected from among the first and second patches P1 and P2. For example, the step of selecting a patch, closer to the magnified patch MP, from among the first and second patches P1 and P2 may be performed based on the magnified patch MP and descriptors of the first and second patches P1 and P2.

An exemplary method of reinforcing the high frequency component from one patch to another is disclosed in "Example-Based Super-Resolution", IEEE Computer Graphics and Applications" Vol. 22, pp. 56-65, March 2002 published in Apr. 22, 2002 by W. T. Freeman et al, which is incorporated herein as a reference.

In the magnified frame MF, the magnified patch MP may be replaced with a patch the high frequency component of which is reinforced. When reinforcing of high frequency components on patches of the magnified frame MF is ended, there may be generated a frame the high frequency component of which is reinforced. The frame the high frequency component of which is reinforced may be output as the output frame HRF.

The patches P1 and P2 used during an upscale operation and the differences between the patches P1 and P2 and the magnified patch MP may be transferred to the dictionary management unit 114 as patch-use data PUD.

In an exemplary embodiment, the difference (or, similarity) between patches may be calculated according to one of various methods such as SAD (Sum of Absolute Difference), correlation, and so on.

Figures 7, 8:
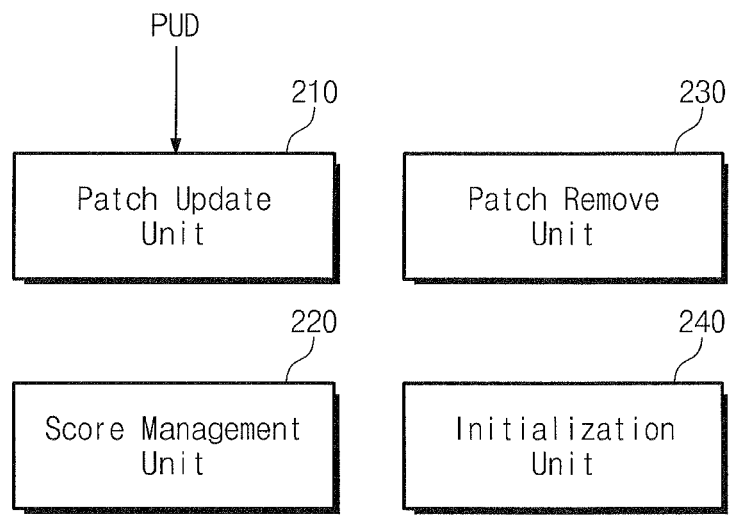
FIG. 7 is a block diagram schematically illustrating a dictionary management unit in the image processor of FIG. 2.
FIG. 8 is a table of patches managed in a patch dictionary unit.

FIG. 7 is a block diagram schematically illustrating a dictionary management unit 114 in the image processor of FIG. 2. Referring to FIGS. 2 and 7, the dictionary management unit 114 includes a patch update unit 210, a score management unit 220, a patch remove unit 230, an initialization unit 240, and an index management unit 250.

The patch update unit 210 receives patch-use data PUD from an upscale unit 112. The patch update unit 210 updates patches stored in a patch dictionary unit 113 based on the patch-use data PUD. For example, the patch update unit 210 may add a patch included in the patch-use data PUD to the patch dictionary unit 113. The patch update unit 210 may replace a patch stored in the patch dictionary unit 113 with a patch included in the patch-use data PUD. The patch update unit 210 may combine the patch stored in the patch dictionary unit 113 and the patch included in the patch-use data PUD.

The score management unit 220 is configured to manage patches registered at the patch dictionary unit 113. Each of the patches registered at the patch dictionary unit 113 has a score. The score management unit 220 may increase or decrease scores of patches of the patch dictionary unit 113. Alternatively, the score management unit 220 may set scores of patches of the patch dictionary unit 113 to predetermined values.

The patch remove unit 230 may be configured to remove (e.g., delete) a patch from the patch dictionary unit 113. The patch remove unit 230 may remove a patch from the patch dictionary unit 113, based on a predetermined event or scores of patches.

The initialization unit 240 is configured to initialize the patch dictionary unit 113. At initialization, the initialization unit 240 deletes all patches of the patch dictionary unit 113, for example. At initialization, the initialization unit 240 may delete the remaining patches of the patch dictionary unit 113 other than predetermined baseline patches. The initialization unit 240 may perform initialization by deleting all patches of the patch dictionary unit 113 and adding baseline patches to the patch dictionary unit 113. When an image processor 111 starts to process an image, the initialization unit 240 may initialize the patch dictionary unit 113. The initialization unit 240 may initialize the patch dictionary unit 113 when the image processor 111 detects a video cut or scene change.

FIG. 8 illustrates a table of patches managed at a patch dictionary unit 113. Referring to FIG. 8, each of patches registered at a patch dictionary unit 113 has a descriptor, a high frequency component, and a score.

The high frequency component in the table of patches indicates a high frequency component which a patch has. The high frequency component may be used to reinforce a magnified patch.

The descriptor may include information about a low frequency component extracted from an area including a patch. For example, when a patch has a high frequency component of a frame fragment having a 5×5 size, the descriptor of the patch may be information about a low frequency component extracted from a 15×15 size of frame fragment including the patch. The descriptor may be used to calculate the difference from a magnified patch MP.

The score may be information assigned to patches to manage the patches.

In FIG. 8, there are illustrated exemplary patches each including a descriptor, a high frequency component, and a score. However, the inventive concept is not limited thereto. For example, patches stored in the patch dictionary unit 113 may include information to be compared with a magnified patch MP and information used to reinforce a high frequency component of the magnified patch MP.

Figure 9:
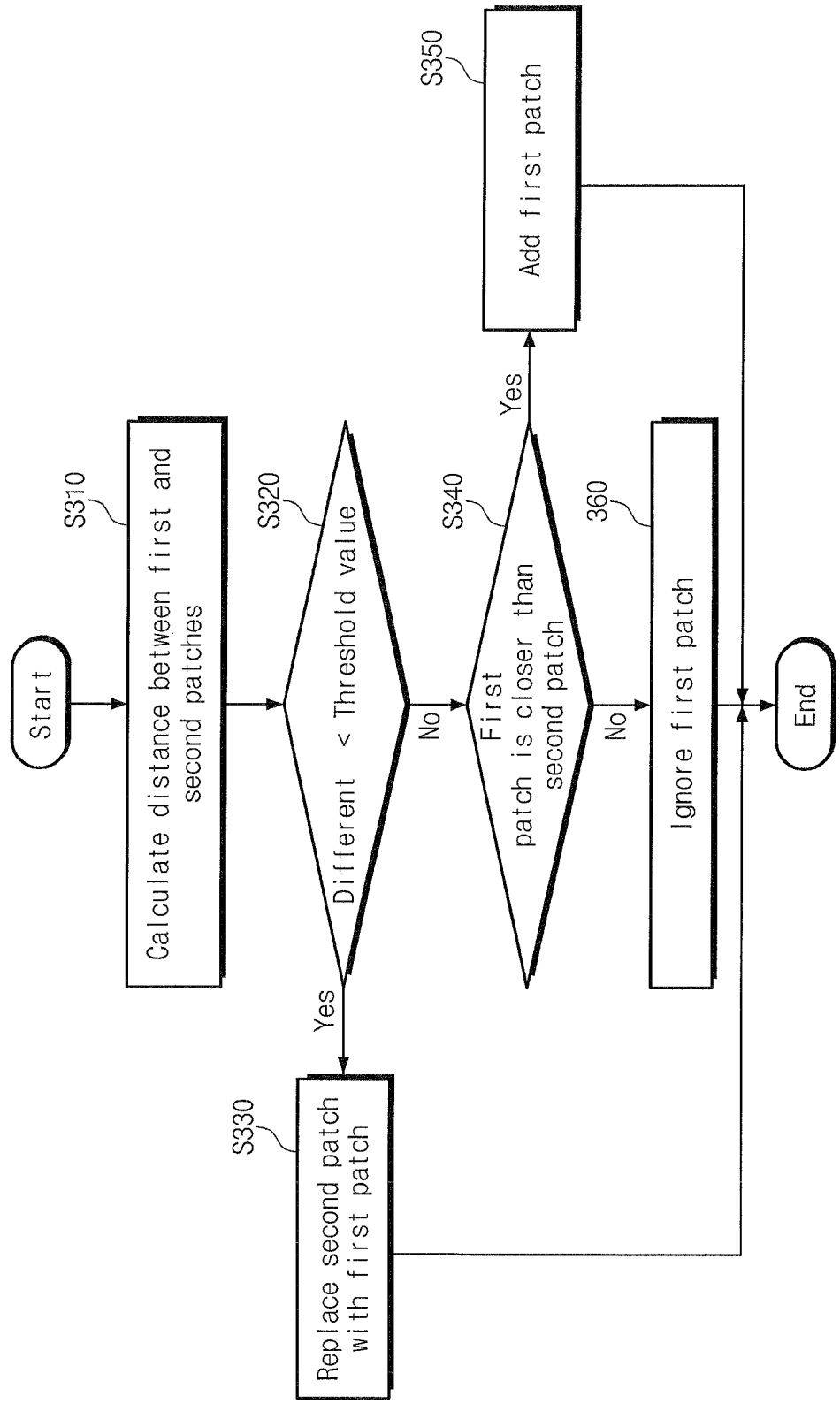
FIG. 9 is a flow chart illustrating a first exemplary operating method of the dictionary management unit of FIG. 7.

FIG. 9 is a flow chart illustrating a first exemplary operating method of a dictionary management unit 114 of FIG. 7. An exemplary operating method of a patch update unit 210 in a dictionary management unit 114 is illustrated in FIG. 9. Referring to FIGS. 6, 7, and 9, in step S310, the difference between a first patch P1 and a second patch P2 is calculated. The difference between the first patch P1 and the second patch P2 may be calculated according to one of various methods such as SAD (Sum of Absolute Differences), correlation, and so on.

In step S320, whether the calculated difference is less than a threshold value is determined. If the calculated difference is less than the threshold value, in step S330, the second patch P2 may be replaced with the first patch P1. If the difference between the first patch P1 and the second patch P2 is less than the threshold value, the first patch and second patches P1 and P2 may include very similar information. In this case, the first patch P1 later than the second patch P2 searched for in a patch dictionary unit 113 may include information suitable for current and next frames. Thus, the second patch P2 registered at the patch dictionary unit 113 may be replaced with the first patch P1 searched for in an input frame IF.

If the calculated difference is not less than the threshold value, the method proceeds to step S340.

In step S340, whether the first patch P1 is closer to a magnified patch MP than the second patch P2 may be determined. In exemplary embodiments, the difference between the first patch P1 and the magnified patch MP and the difference between the second patch P2 and the magnified patch MP may be calculated or received as patch-use data PUD.

If the first patch P1 is closer to the magnified patch MP than the second patch P2, then in step S350, the first patch P1 may be added to the patch dictionary unit 113. In the case that the first and second patches P1 and P2 are not sufficiently similar (No branch of decision step S320) and the first patch P1 newly searched for is closer to the magnified patch MP than the second patch P2, the first patch P1 newly searched for is added to the patch dictionary unit 113. Thus, in the case that the first patch P1 newly searched for includes useful information not stored in the patch dictionary unit 113, the first patch P1 newly searched for is added to the patch dictionary unit 113. When the first patch P1 is added, it may be added to the patch dictionary unit 113 to have a predetermined score. The predetermined score assigned to the first patch P1 may be decided according to the difference between the first patch P1 and the magnified patch MP. For example, as the difference between the first patch P1 and the magnified patch MP increases, the score assigned to the first patch P1 may decrease.

If the first patch P1 is not closer to the magnified patch MP than the second patch P2, in step S360, the first patch P1 newly searched for may be ignored and the patch dictionary unit 113 is not updated. Thus, in the case that the first patch P1 newly searched for does not include information more useful than patches stored in the patch dictionary unit 113, the first patch P1 newly searched for may be ignored.

In exemplary embodiments, instead of replacing the second patch P2 with the first patch P1, such a patch that the first and second patches P1 and P2 are combined to replace the second patch P2. Thus, the first patch P1 newly searched for may be combined with the second patch registered at the patch dictionary unit 113. The first and second patches P1 and P2 may be combined based on one of various methods such as an average, a weighted average, a moving average, and so on. The combination may include refinement.

Figure 10:
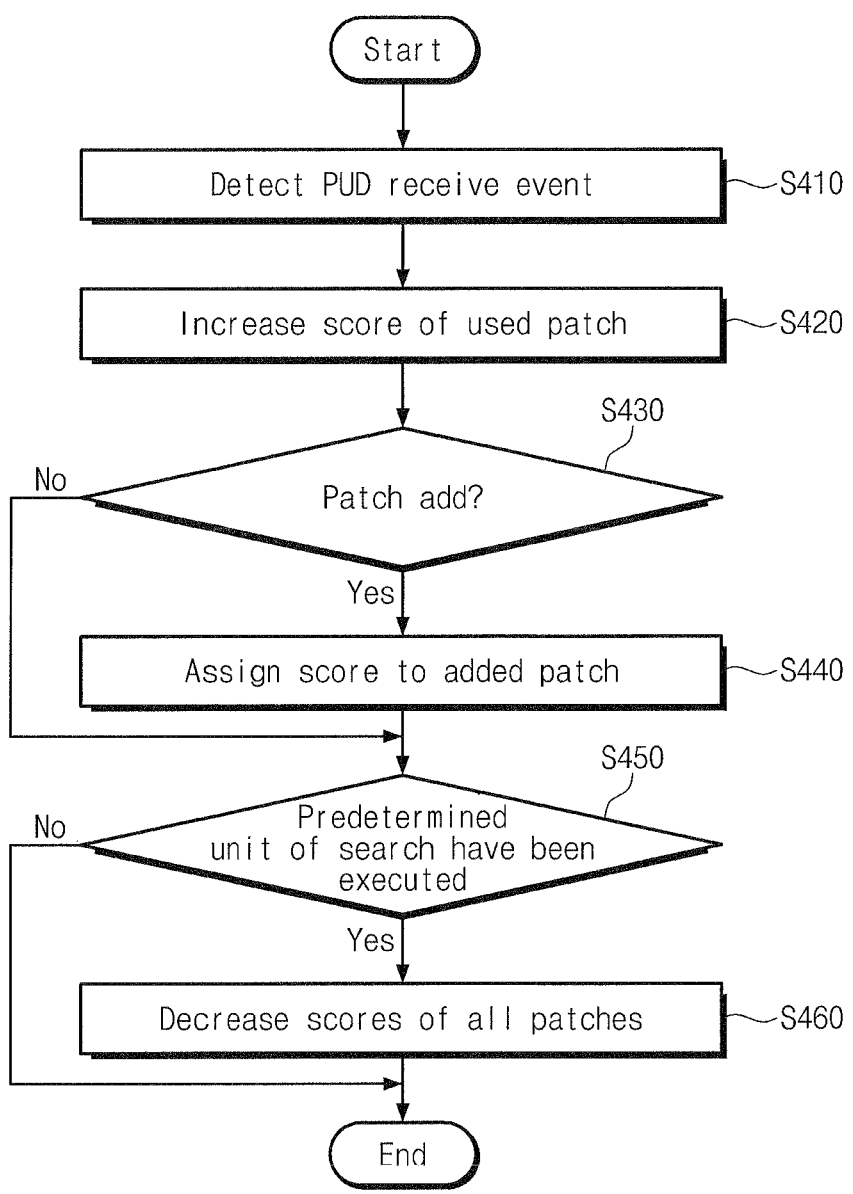
FIG. 10 is a flow chart illustrating a second exemplary operating method of the dictionary management unit of FIG. 7.

FIG. 10 is a flow chart illustrating a second exemplary operating method of the dictionary management unit 114 of FIG. 7. An exemplary operating method of the score management unit 220 in a dictionary management unit 114 is illustrated in FIG. 10. Referring to FIGS. 6, 7, and 10, in step S410, an event indicating an input of patch-use data PUD is detected. The operating method of FIG. 10 may be performed whenever the patch-use data PUD is received. Thus, the operating method of FIG. 10 may be performed whenever a magnified patch MP is upscaled.

In step S420, the score of a patch used is increased. For example, the score of a patch, used in an upscale operation, from among patches stored in a patch dictionary unit 113 is increase. As described in step S330 of FIG. 9, replacement with a first patch P1 newly searched for may be performed or the score of a patch combined with the first patch newly searched for may increase. As described in step S360 of FIG. 9, the score of a patch used for reinforcement of a high frequency component of a magnified patch MP may increase.

In step S430, whether a patch is added is determined. For example, as described in step S350 of FIG. 9, whether the first patch P1 newly searched for is added to the patch dictionary unit 113 is determined. If a patch is added, in step S440, a score may be assigned to the patch added.

For example, its score may be decided according to the difference (or, similarity) between the added patch and the magnified patch MP. Its score may increase in proportion to a decrease in the difference between the added patch and the magnified patch MP or in proportion to an increase in the similarity between the added patch and the magnified patch MP. As the added patch includes information useful to upscale, the score of the added patch may increase.

For example, its score may be decided according to the difference (or, similarity) between the added patch and patches stored in the patch dictionary unit 113. The score of the patch added may increase in proportion to an increase in the difference between the added patch and patches stored in the patch dictionary unit 113 or in proportion to a decrease in the similarity between the added patch and patches stored in the patch dictionary unit 113. Thus, as the added patch includes information distinguishable from patches stored in the patch dictionary unit 113, the score of the added patch may increase.

In step S450, whether a search operation has been performed by a predetermined unit of search is determined. For example, it is determined whether a search operation has been performed by a line unit of an input frame LRF, by a unit of two or more lines thereof, or by a frame unit. In the case that a search operation is performed by a predetermined unit, in step S460, scores of all patches stored in the patch dictionary unit 113 may decrease. The scores of the patches may decrease by a predetermined value. In exemplary embodiments, scores of the remaining patches other than baseline patches may only decrease.

In steps S450 and S460, the scores of patches stored in the patch dictionary unit 113 decrease whenever a search operation is performed by a predetermined unit. Thus, the scores of patches not used at an upscale unit 112 may gradually decrease.

As described above, patches stored in the patch dictionary unit 113 are managed. The score of a patch frequently used at an upscale operation may be managed to be high.

Figure 11:
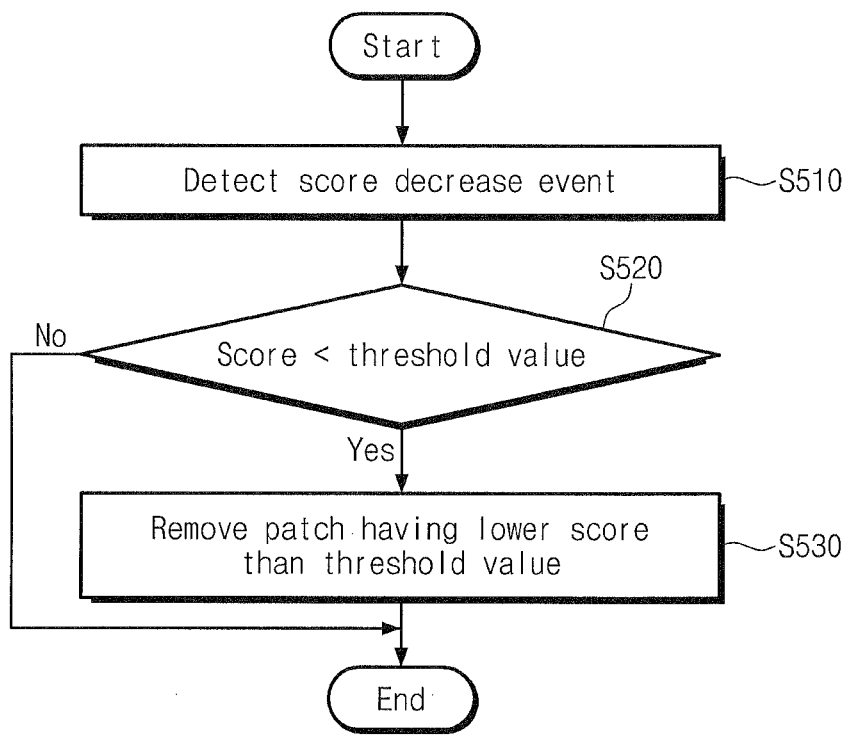
FIG. 11 is a flow chart illustrating a third exemplary operating method of the dictionary management unit of FIG. 7.

FIG. 11 is a flow chart illustrating a third exemplary operating method of a dictionary management unit 114 according to an embodiment of the inventive concept. An exemplary operating method of a patch remove unit 230 in a dictionary management unit 114 is illustrated in FIG. 11. Referring to FIGS. 6, 7, and 11, in step S510, an event indicating a decrease in the score of a patch is detected. For example, as described with reference to step S460 of FIG. 10, an event indicating that scores of patches stored in a patch dictionary unit 113 decrease may be detected. The operating method of FIG. 11 may be performed whenever scores of patches are decreased by the score management unit 220. The operating method of FIG. 11 may be performed following step S460 of FIG. 10.

In step S520, whether a score lower than a threshold value exists is determined. For example, whether a patch having a score, lower than the threshold value, from among patches stored in the patch dictionary unit 113 exists is determined. If a score lower than a threshold value does not exist, removing of patches is not performed.

If a score lower than a threshold value exists, in step S530, a patch having a score lower than a threshold value is removed (or, deleted) from the patch dictionary unit 113.

As described with reference to FIG. 10, the score of a patch not used at an upscale operation may decrease. Patches, having scores (or, unused levels) lower than a threshold value, from among patches stored in the patch dictionary unit 113 are removed from the patch dictionary unit 113 through the operating method of FIG. 11. It is possible to prevent the patch dictionary unit 113 from taking a capacity excessively by removing unused patches from the patch dictionary unit 113. In general, a mobile device may have limited resources (e.g., a memory capacity, battery energy, etc.) in comparison with a fixed device. If unused patches are removed from the patch dictionary unit 113, it is possible to optimizing a mobile device that includes an image processor to perform an upscale operation referring to the patch dictionary unit 113.

Figure 12:
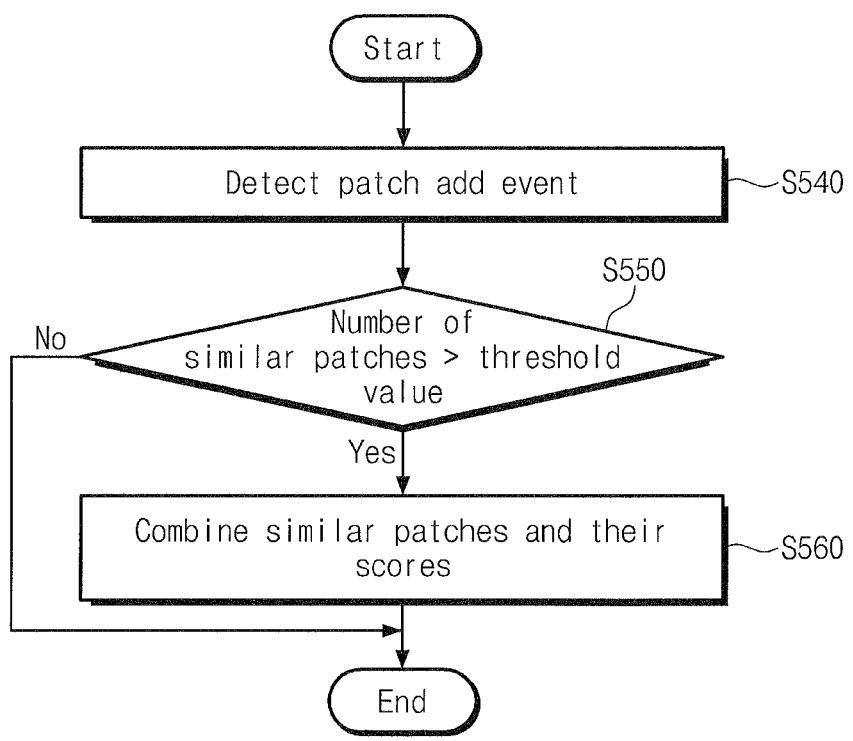
FIG. 12 is a flow chart illustrating a fourth exemplary operating method of the dictionary management unit of FIG. 7.

FIG. 12 is a flow chart illustrating an fourth exemplary operating method of the dictionary management unit 114 of FIG. 7. For example, an operating method of a patch remove unit 230 in a dictionary management unit 114 may be illustrated in FIG. 12. Referring to FIGS. 6, 7, and 12, in step S540, an event indicating adding of a patch is detected. For example, as described with reference to step S350 of FIG. 9, the operating method of FIG. 12 may be performed after execution of an operation where a first patch P1 newly searched for is added to a patch dictionary unit 113.

In step S550, whether the number of similar patches of patches stored in the patch dictionary unit 113 is larger than a threshold value is determined. For example, the number of patches, similar to an added patch, from among patches stored in the patch dictionary unit 113 may be detected. The number of patches, having a difference from an added patch less than a reference value, from among patches stored in the patch dictionary unit 113 may be detected. The detected number may be compared with a threshold value.

In step S560, similar patches are combined. For example, patches, having a score lower than a second reference value, from among the detected patches may be combined one another. Descriptors, high frequency components, and scores of patches may be combined one another. The descriptors, high frequency components and scores of the patches may be combined based on one of various algorithms such as an average, a weighted average, a moving average, and so on. The combination may include refinement.

As described with reference to FIG. 10, the score of a patch not used at an upscale operation may decrease. Patches, having scores (or, unused levels) lower than a threshold value, from among patches stored in the patch dictionary unit 113 may be combined into one patch at the patch dictionary unit 113 through the operating method of FIG. 12. It is possible to prevent the patch dictionary unit 113 from taking up capacity excessively by combining unused patches.

Figure 13:
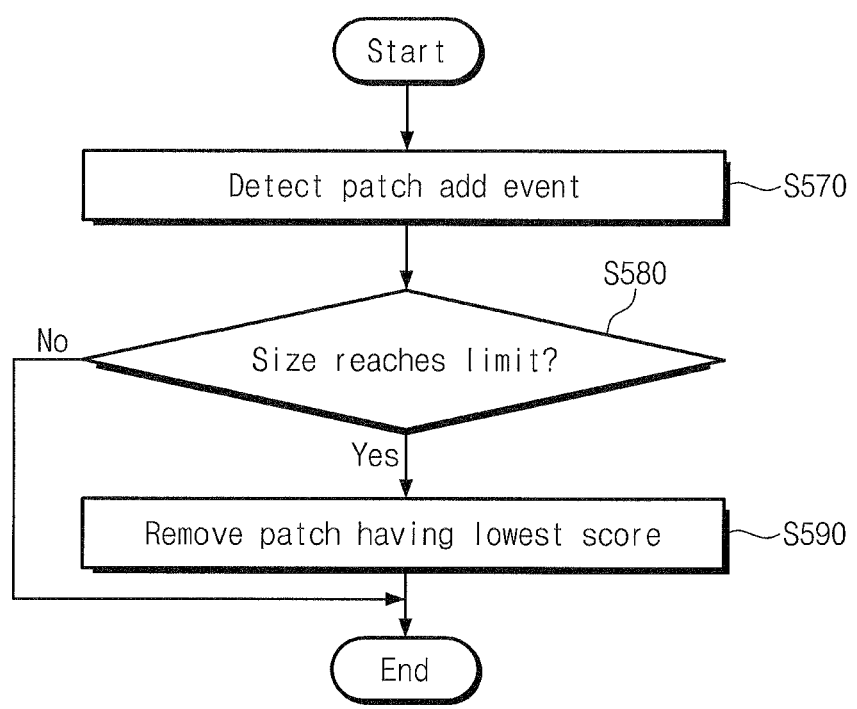
FIG. 13 is a flow chart illustrating a fifth exemplary operating method of the dictionary management unit of FIG. 7.

FIG. 13 is a flow chart illustrating a fifth operating method of the dictionary management unit 114 of FIG. 7. An exemplary operating method of a patch remove unit 230 in a dictionary management unit 114 is illustrated in FIG. 13. Referring to FIGS. 6, 7, and 13, in step S570, an event indicating adding of a patch is detected. For example, as described with reference to step S350 of FIG. 9, the operating method of FIG. 13 may be performed after execution of an operation where a first patch P1 newly searched for is added to a patch dictionary unit 113.

In step S580, whether the size (inventory) of a patch dictionary unit 113 has reached its limit is determined. For example, whether the number of patches stored in the patch dictionary unit 113 reaches a predetermined limit value is determined. For example, whether a free storage capacity of the patch dictionary unit 113 has decreased down to a predetermined limit value is determined. If the inventory size of the patch dictionary unit 113 has not reached the limit, removing of a patch may not be performed. If the inventory size of the patch dictionary unit 113 has reached the limit, in step S590, a patch, having the lowest score, from among patches stored in the patch dictionary unit 113 is removed.

Figure 14:
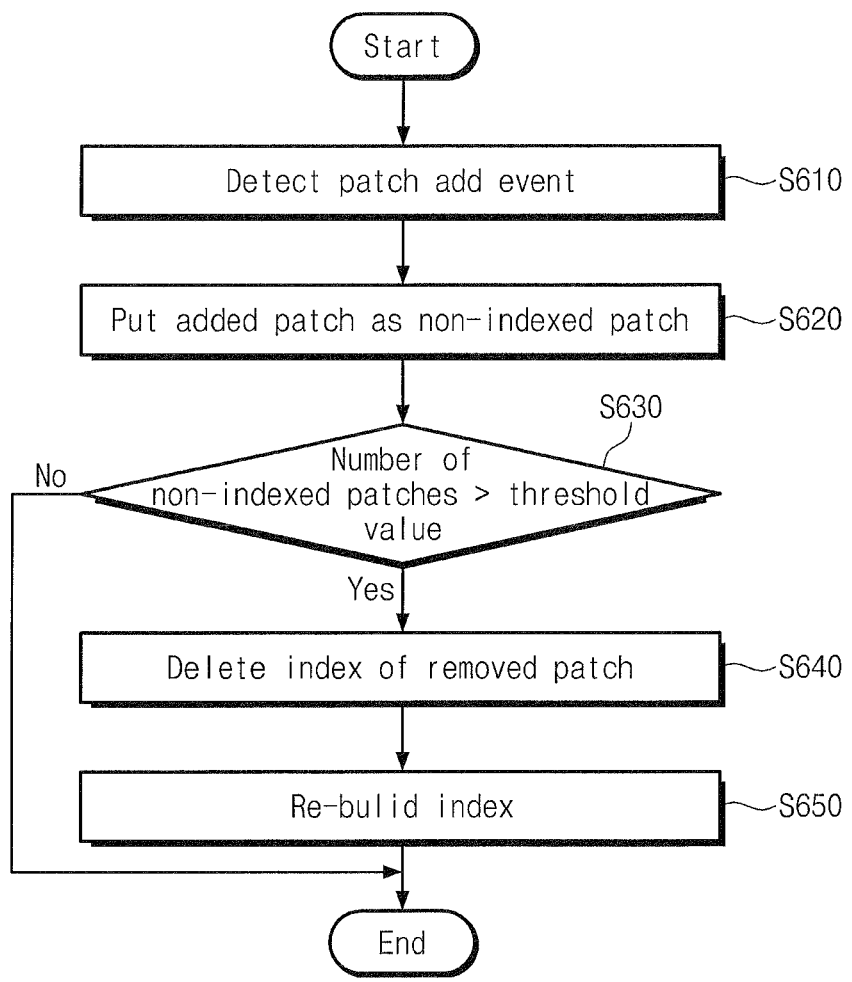
FIG. 14 is a flow chart illustrating an exemplary process in which indexes of a patch dictionary unit are managed.

FIG. 14 is a flow chart illustrating an exemplary process in which indexes of a patch dictionary unit 113 are managed. In FIG. 14, there is illustrated an example in which indexes are managed when patches of a patch dictionary unit 113 are managed based on indexes. However, the inventive concept is not limited thereto.

Referring to FIGS. 2 and 14, in step S610, an event indicating adding of a patch is detected. For example, as described with reference to step S350 of FIG. 9, the operating method of FIG. 14 may be performed after execution of an operation where a first patch P1 newly searched for is added to a patch dictionary unit 113.

In step S620, an added patch is set to a non-index patch.

In step S630, whether the number of non-index patches is larger than a threshold value is determined. If the number of non-index patches is not larger than the threshold value, the method may be ended. If the number of non-index patches is larger than the threshold value, steps S640 and S650 are performed.

In step S640, an index of a patch is removed from the patch dictionary unit 113. In step S650, an index is rebuilt.

In exemplary embodiments, rebuilding of indexes may be executed whenever the number of patches added to the patch dictionary unit 113 reaches a threshold value. At rebuilding of indexes, indexes of deleted patches may be deleted. Exhaustive search may be executed with respect to patches not having indexes.

In FIG. 14, there is described an example in which rebuilding of indexes is executed whenever the number of patches added to the patch dictionary unit 113 reaches a threshold value. However, the inventive concept is not limited thereto. For example, the rebuilding of indexes may be executed periodically. The rebuilding of indexes may be executed whenever frame-based search is ended or whenever a search operation performed by a line unit of a frame or by a unit of two or more lines of the frame is ended.

In exemplary embodiments, the rebuilding of indexes may be executed when the patch dictionary unit 113, an image processor 111 or a processor 110 is at an idle state.

Figure 15:
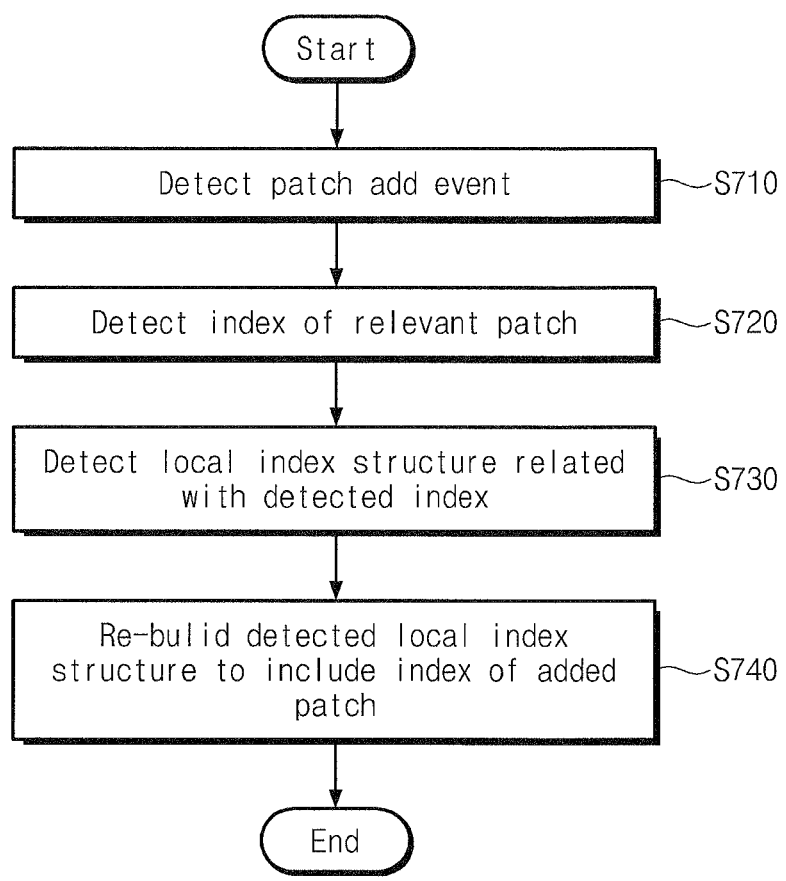
FIG. 15 is a flow chart illustrating another exemplary process in which indexes of a patch dictionary unit are managed.

FIG. 15 is a flow chart illustrating an exemplary process in which indexes of a patch dictionary unit 113 are managed. In FIG. 15, there is illustrated an example in which indexes are managed when patches of a patch dictionary unit 113 are managed based on indexes. However, the inventive concept is not limited thereto.

Referring to FIGS. 2 and 15, in step S710, an event indicating adding of a patch is detected. For example, as described with reference to step S350 of FIG. 9, the operating method of FIG. 15 may be performed after execution of an operation where a first patch P1 newly searched for is added to a patch dictionary unit 113.

In step S720, the index of a relevant patch is detected. For example, the index of a patch, similar to an added patch, from among patches stored in a patch dictionary unit 113 may be detected.

In step S730, a local index structure of the detected patch is detected.

In step S740, the detected local index structure is rebuilt to include an index of the added patch. For example, an index structure of a sub-tree belonging to subordination to the detected patch may be rebuilt. For example, a local index structure may be rebuilt such that an index of the added patch is included in a sub-tree of the detected patch.

Likewise, when a specific patch is deleted from the patch dictionary unit 113, a local index structure associated with the deleted patch may be detected and the detected local index structure may be rebuilt.

Figure 16:
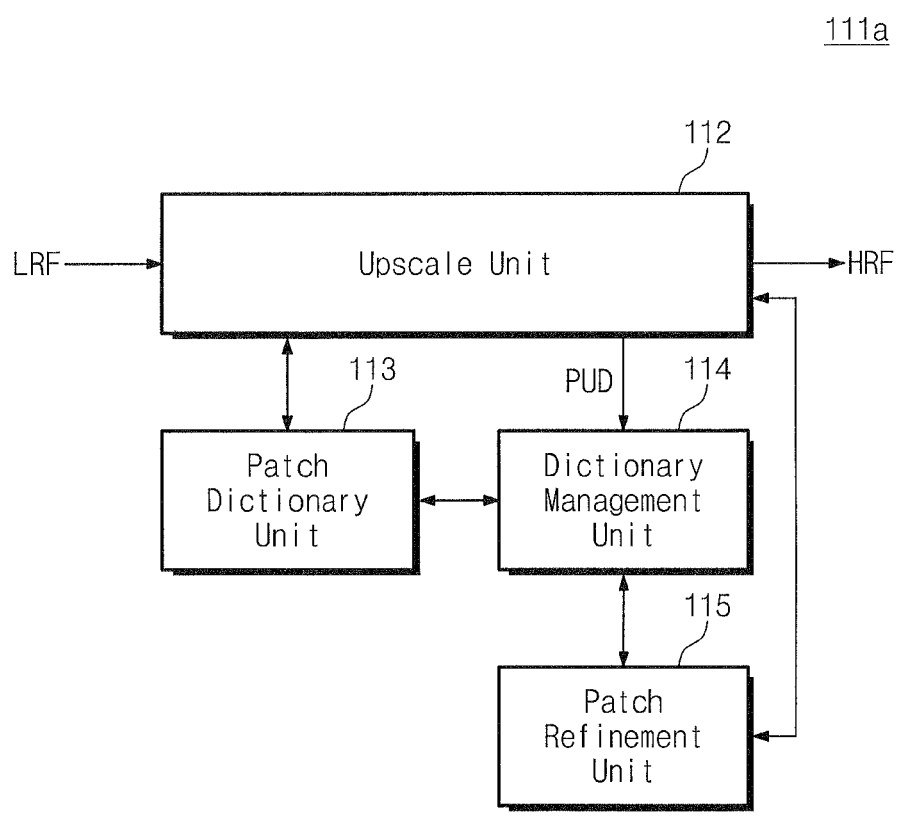
FIG. 16 is a block diagram of an image processor according to an exemplary embodiment of the inventive concept.

FIG. 16 is a block diagram of an image processor 111a according to an exemplary embodiment of the inventive concept. Referring to FIG. 16, an image processor 111 includes an upscale unit 112, a patch dictionary unit 113, a dictionary management unit 114, and a patch refinement unit 115. In comparison with the image processor in FIG. 2, the image processor 111a further includes the patch refinement unit 115.

The patch refinement unit 115 may be configured to execute refinement based on a plurality of patches. For example, the patch refinement unit 115 may be configured to restore high frequency components of two or more patches through alignment of two or more similar patches. The alignment may be executed with a sub-pixel resolution. An example of a patch refining method is disclosed in a paper (published by Michal Irani and Shmuel Peleg, June, 1990), entitled "SUPER RESOLUTION FROM IMAGE SEQUENCES", www.cs.huji.ac.il/~peleg/papers/icpr90-SuperResolutionSequences.pdf the contents of which are incorporated by reference.

Patches of the same scale as a magnified patch may be searched for in the patch dictionary unit 113 and in a magnified frame. The patch refinement unit 115 may execute a refinement using the searched for patches and the magnified patch. The dictionary management unit 114 may update the patch dictionary unit 113 based on the result of the refinement. For example, if patches are not searched for in the patch dictionary unit 113, the dictionary management unit 115 may update the patch dictionary unit 113 with the searched for patches from the magnified frame.

Figure 17:
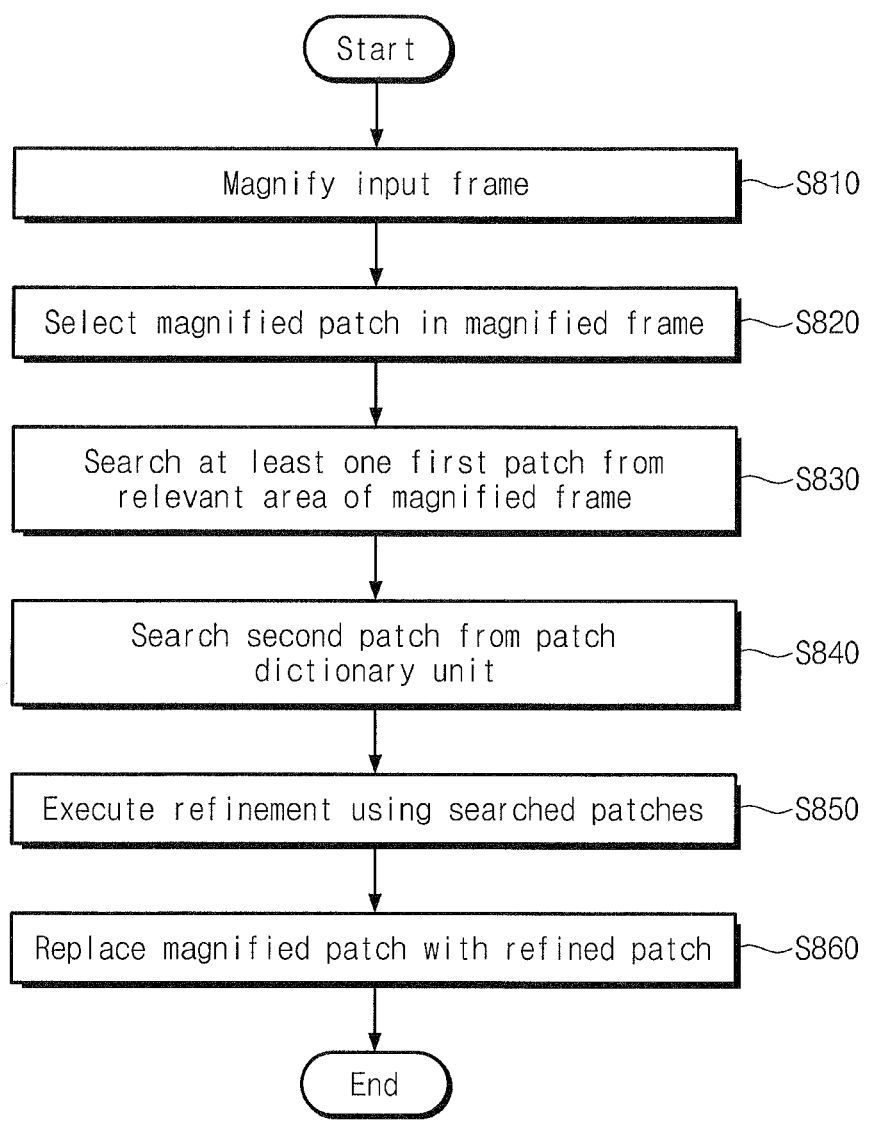
FIG. 17 is a flow chart illustrating an image processing method of the image processor of FIG. 16.

FIG. 17 is a flow chart illustrating an image processing method of the image processor 111a of FIG. 16. Referring to FIGS. 16 and 17, in step S810, an input frame LRF is magnified. For example, the input frame LRF may be magnified to have the size required by an output frame HRF. The input frame LRF may be magnified through simple interpolation such as bicubic. The magnified frame may have a size corresponding to the output frame HRF, not a resolution corresponding to the output frame HRF. The magnified frame may have a less amount of high frequency component compared with a low frequency component.

In step S820, a magnified patch in the magnified frame is selected. This may be executed by an upscale unit 112.

In step S830, at least one first patch is searched for in a relevant area of the magnified frame. This may be executed by the upscale unit 112.

In step S840, a second patch may be searched for in a patch dictionary unit 113. In exemplary embodiments, the upscale unit 112 may search the patch dictionary unit 113 based on a selected patch. A search step of the patch dictionary unit 113 may be executed based on a descriptor as described with reference to FIGS. 2 to 15.

Figure 18:
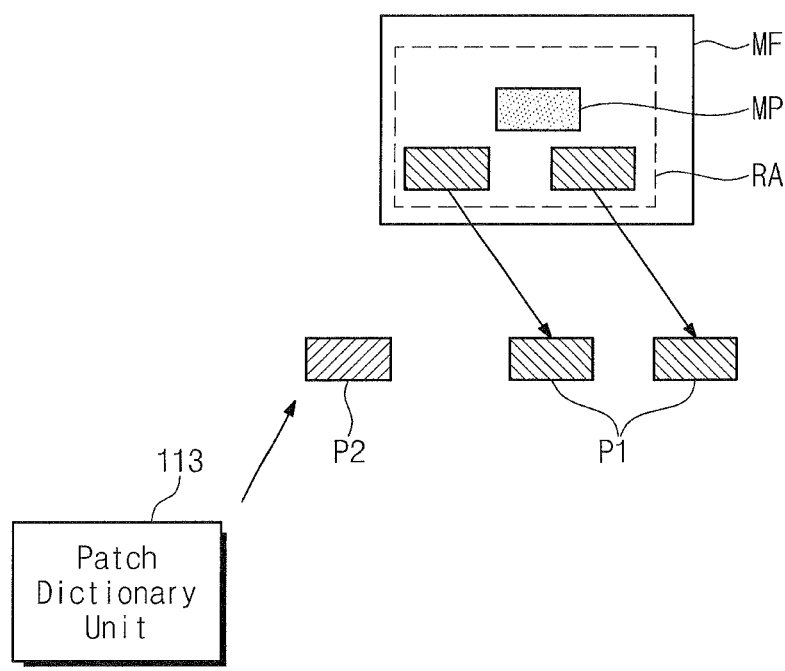
FIG. 18 is an exemplary frame for illustrating the method of executing steps S820 and S840 of the method of FIG. 17.

A method of executing steps S820 and S840 is illustrated in FIG. 18. Referring to FIGS. 16 to 18, two first patches P1 may be searched for in a relevant area of a magnified frame MF. For example, first patches P1 similar to a magnified patch MP or having a difference from the magnified patch MP less than a reference value may be searched for in the relevant area RA. A predetermined number of first patches P1 most similar to the magnified patch MP or having the smallest difference from the magnified patch MP may be searched for in the relevant area RA. The number of first patches P1 searched for in the relevant area RA may not be limited.

A second patch P2 may be searched for in a patch dictionary unit 113. For example, a second patch P2 most similar to the magnified patch MP or having the smallest difference may be searched for in the patch dictionary unit 113. A second patch P2 having the difference from the magnified patch MP less than a reference value may be searched for in the patch dictionary unit 113.

Referring to FIGS. 16 to 18, in step S850, refinement may be executed using the searched for patches. For example, the refinement may be executed by aligning the first patches P1 searched for in the relevant area RA and the second patch P2 searched for in the patch dictionary unit 113. A patch refinement unit 115 may receive the magnified patch MP from the upscale unit 112 and the first and second patches P1 and P2 to execute refinement.

In exemplary embodiments, in the case that a second patch P2 is not searched for in the patch dictionary unit 113 and at least one first patch P1 is searched for in the relevant area RA, the refinement unit 115 may execute refinement based on the magnified patch MP and the at least one first patch P1. In the case that a second patch P2 is searched for in the patch dictionary unit 113 and at least one first patch P1 is not searched for in the relevant area RA, the refinement unit 115 may execute refinement based on the magnified patch MP and the second patch P2. In the case that a second patch P2 is not searched for in the patch dictionary unit 113 and at least one first patch P1 is not searched for in the relevant area RA, the refinement unit 115 may not execute refinement.

In step S860, the magnified patch MP is replaced with a refined patch. The upscale unit 112 replaces the magnified patch MP with the refined patch. In exemplary embodiments, if the magnified patch MP is not refined, it may be maintained.

If the method in FIG. 18 is performed with respect to all patches of a magnified frame MP, high frequency components of the magnified frame MF may be restored.

Figure 19:
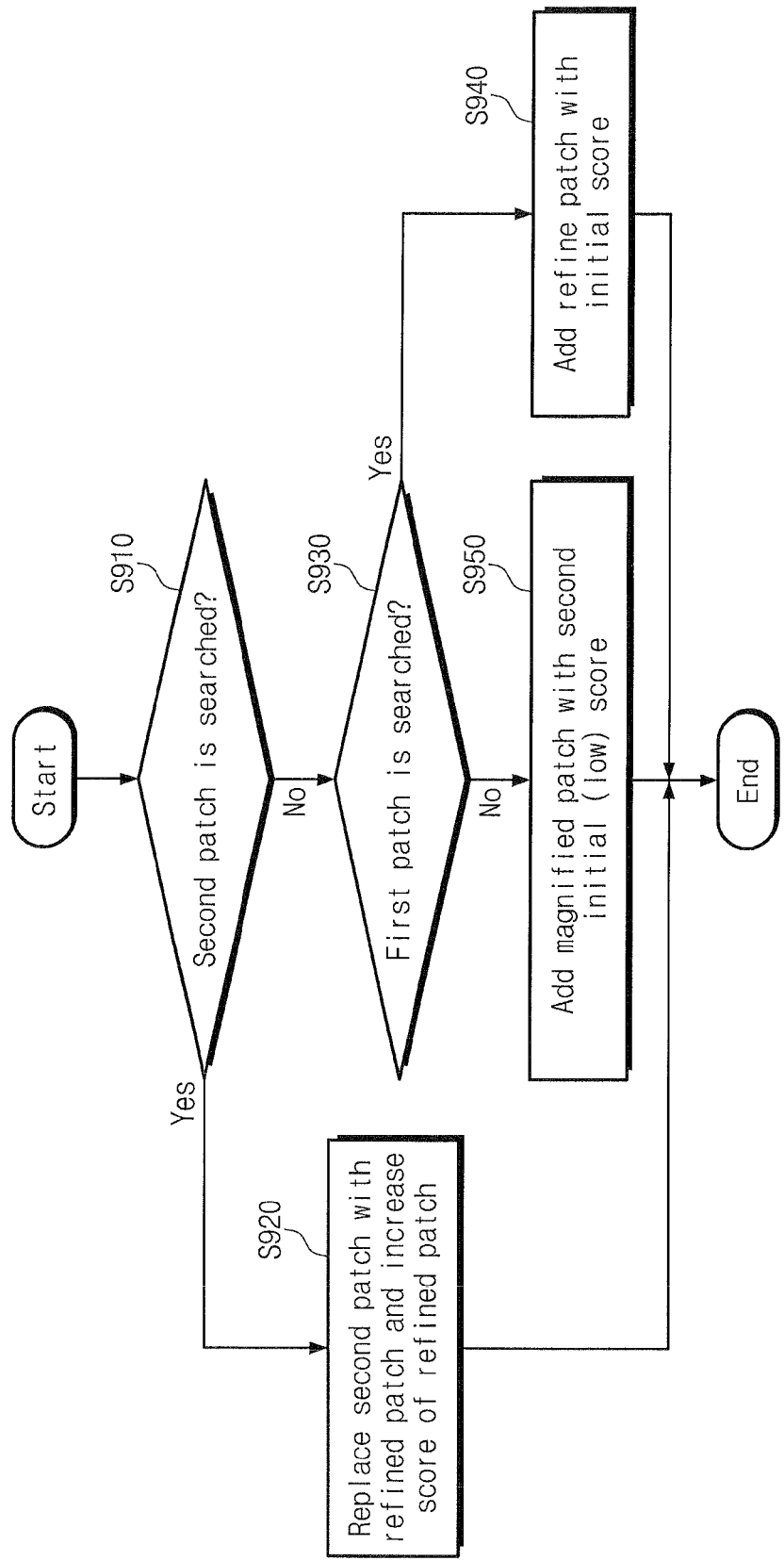
FIG. 19 is a flow chart illustrating an operating method of the dictionary management unit of FIG. 16.

FIG. 19 is a flow chart illustrating an operating method of the dictionary management unit 114 of FIG. 16. Referring to FIGS. 16, 18, and 19, in step S910, whether a second patch P2 is searched for is detected. If a second patch P2 similar to a magnified patch MP is searched for in a patch dictionary unit 113, refinement may be executed based on the second patch P2 according to the method described with reference to FIG. 18. In step S920, a dictionary management unit 114 replaces a second patch P2 stored in the patch dictionary unit 113 with a refined patch, and may increase the score of the refined patch. If the second patch P2 is not searched for, the method proceeds to S930.

In step S930, whether at least one first patch P1 is searched for is determined. If at least one first patch P1 is searched for in the relevant area RA of a magnified frame MF, refinement may be executed based on a magnified patch MP and the at least one first patch P1. Since the second patch P2 is not searched for in the patch dictionary unit 113, the refined patch may be a patch which is not similar to patches stored in the patch dictionary unit 113. The refined patch may be a patch having the difference from patches stored in the patch dictionary unit 113 larger than a reference value. In step S940, the refined patch may be added to the patch dictionary unit 113. The refined patch may be added with an initial score. The initial score may be decided according to the difference (or, similarity) between the refined patch and patches stored in the patch dictionary unit 113.

If at least one first patch P1 is not searched for, a patch similar to the magnified patch MP may not exist at the patch dictionary unit 113 and the relevant area RA. In step S950, a dictionary management unit 114 may add the magnified patch MP to the patch dictionary unit 113. The magnified patch MP may be stored with a second initial score. A value of the second initial score may be smaller than that of the initial score set forth at step S940. In exemplary embodiments, the second score may be set such that the magnified patch MP is maintained at the patch dictionary unit 113 while a search operation is executed by a frame unit, a line unit of a frame, or a unit of predetermined lines of a frame.

In exemplary embodiments, patches stored in the patch dictionary unit 113 may be removed according to the method described with reference to FIGS. 2 to 15 so as to be initialized. The patch dictionary unit 113 may include baseline patches.

FIG. 20 shows tables for describing an example in which patches stored in a patch dictionary unit 113 are managed. Referring to FIGS. 16 and 20, a patch dictionary unit 113 may manage patches according to a pointer-based management manner or a contents-based management manner.

In the pointer-based management manner, patches may be managed according to a pointer to specific location, a pointer to frame, and a frame.

A frame may be a copy of a magnified frame MF. The patch dictionary unit 113 may store a frame. A pointer to frame may indicate that a patch belongs to any frame. The pointer to specific location may indicate that a patch corresponds to any location of a frame designated by the pointer of frame.

In exemplary embodiments, in the case that the number of patches stored in the patch dictionary unit 113 is less, most magnified patches of the magnified frame MF may not be refined. Magnified patches not refined may be stored in the patch dictionary unit 113. Thus, most patches of the magnified frame MF may be added to the patch dictionary unit 113. At this time, in the case that the pointer-based management is used, patches may be simply expressed using one magnified frame MF and pointers according to the magnified frame MF. In the case that the number of patches stored in the patch dictionary unit 113 is less, the pointer-based management may be used such that the magnified frame MF is stored in the patch dictionary unit 113.

In the contents-based management manner, contents may be stored and managed at the patch dictionary unit 113. In exemplary embodiments, descriptors and high frequency components of patches may be stored in the patch dictionary unit 113. In the case that the number of patches stored in the patch dictionary unit 113 is many, most magnified patches of the magnified frame MF may be refined. Magnified patches may be independently refined based on the first patch P1 of the relevant area RA and the second patch P2 of the patch dictionary unit 113. A refined patch may be replaced with the second patch P2 of the patch dictionary unit 113. Patches independently refined and updated may be managed based on pointers to frame. In the case that the number of patches stored in the patch dictionary unit 113 is many, the contents-based management manner may be used to manage patches independently.

Figure 21:
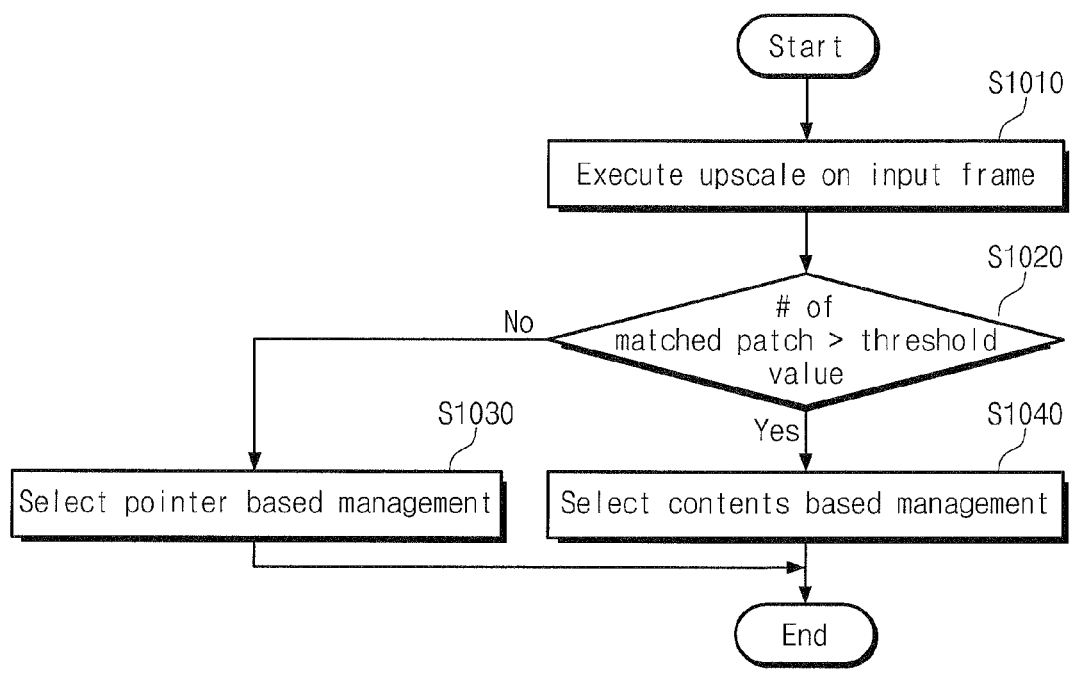
FIG. 21 is a flow chart illustrating an example of a process in which a patch dictionary unit manages patches.

FIG. 21 is a flow chart illustrating an example of a process in which a patch dictionary unit 113 manages patches. Referring to FIGS. 16 and 21, in step S1010, upscale on an input frame is executed. The upscaled frame may include magnified patches. A search operation on each of the magnified patches may be performed based on a patch dictionary unit 113 and a relevant area RA.

In step S1020, whether the number of matched patches is larger than a threshold value is determined. For example, the number of specific patches of magnified patches of the upscaled frame may be counted. Each of the specific patches may have a second patch searched for in a patch dictionary unit 113 or at least one first patch P1 searched for in a relevant area RA. Whether the counted value is larger than the threshold value may be determined.

If the number of matched patches is not larger than the threshold value, in step S1030, pointer-based management is selected. An input frame LRF may be stored in a patch dictionary unit 113, and magnified patches may be stored in the patch dictionary unit 113 with a pointer. In this case, refined patches may be managed according to contents-based management.

If the number of matched patches is larger than the threshold value, in step S1040, the contents-based management is selected. Both the refined patches and unrefined patches may be stored in the patch dictionary unit 113 with contents.

In exemplary embodiments, selection of steps S1030 and S1040 may be applied to a search step of a next frame or a next line. The selection of steps S1030 and S1040 may be applied to a search step of a next frame or a next line, not applied to a current search operation.

In exemplary embodiments, if a patch managed according to the pointer-based management manner is refined and updated, it may be managed according to a contents-based management manner.

In exemplary embodiments, if the number of patches of a specific frame managed according to the pointer-based management manner decreases below a reference value, a management manner of the patches may be switched into the contents-based management manner.

Figure 22:
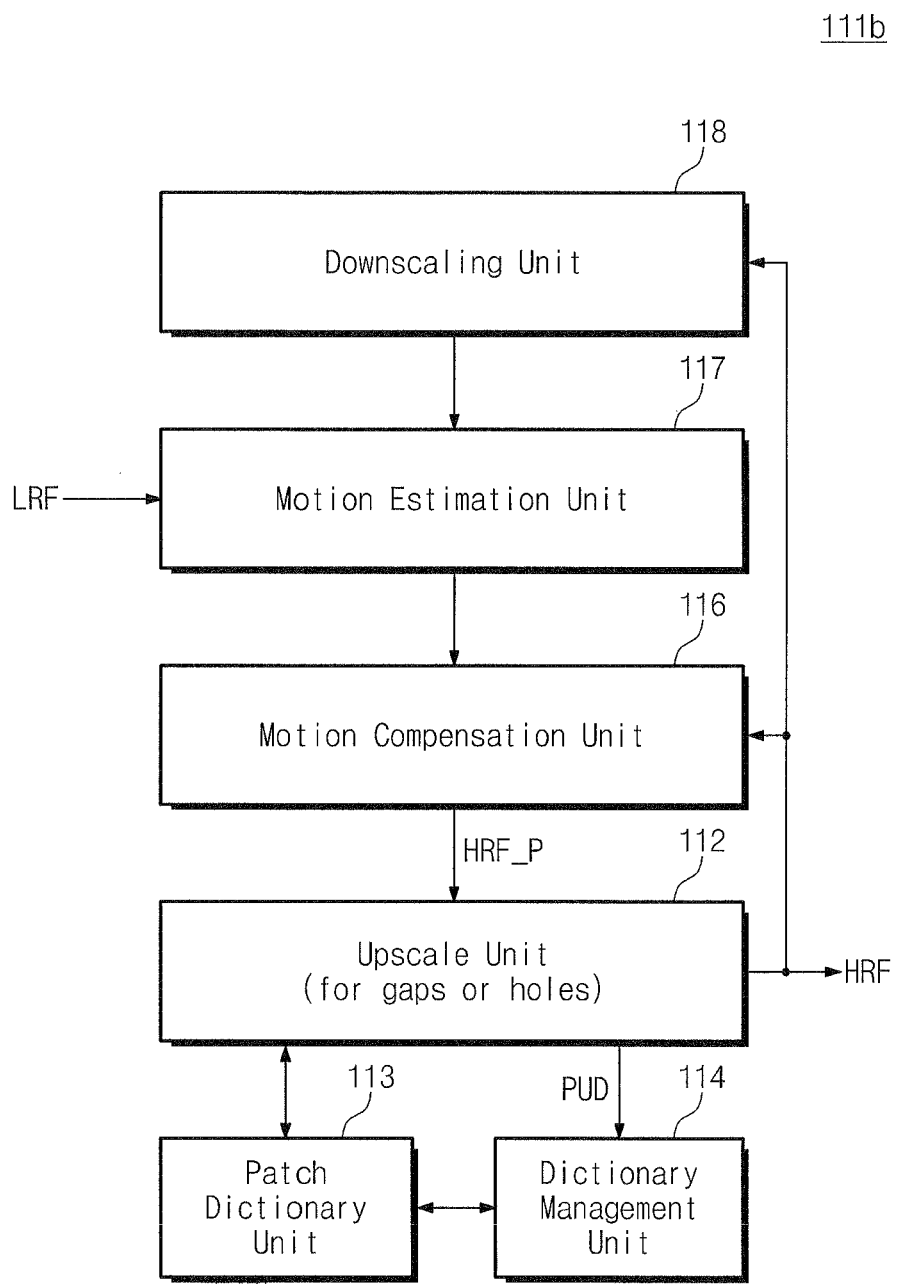
FIG. 22 is a block diagram of an image processor according to an embodiment of the inventive concept.

FIG. 22 is a block diagram schematically illustrating an image processor 111b according to an embodiment of the inventive concept. Referring to FIG. 22, an image processor 111b includes an upscale unit 112, a patch dictionary unit 113, a dictionary management unit 114, a motion compensation unit 116, a motion estimation unit 117, and a downscale unit 118. Compared with an image processor 111 of FIG. 2, the image processor 111b further includes the motion compensation unit 116, the motion estimation unit 117, and the downscale unit 118.

The downscale unit 118 receives an output frame HRF of the upscale unit 112, for example, a previous output frame. The downscale unit 118 downscale the output frame HRF to have a resolution of the input frame LRF. Downscale may be executed according to one of various methods such as bilinear downscale having an anti-aliasing characteristic.

The motion estimation unit 117 receives the input frame LRF, for example, a current input frame and the downscaled frame from the downscale unit 118. The motion estimation unit 117 estimates a motion by comparing the input frame LRF and the downscaled frame. The motion estimation unit 117 generates a motion field according an estimation result.

The motion compensation unit 116 can generate a partial frame upscaled HRF_P by copying patches of the output frame HRF based on the motion field generated by the motion estimation unit 117. The upscaled partial frame HRF_P may have gaps or holes that are not processed by copying of patches based on the motion field.

The upscale unit 112 may receive the partial upscaled frame HRF_P from the motion compensation unit 116. The upscale unit 112 may reinforce high frequency components of gaps or holes of the partial upscaled frame HRF_P referring to the patch dictionary unit 113. In exemplary embodiments, the upscale unit 112 may reinforce high frequency components of gaps or holes according to a method described with reference to FIGS. 2 to 15. The dictionary management unit 114 may manage the patch dictionary unit 113 according to a method described with reference to FIGS. 2 to 15.

In various exemplary embodiments, the downscale unit 118 may be omitted. In this case, the motion estimation unit 117 may compare a previous input frame and a current input frame to generate a motion map. The motion compensation unit 116 may generate the partial upscaled frame HRF_P based on the motion map.

The upscale unit 112 may modify patches of gaps or holes of the partial upscaled frame HRF_P. The dictionary management unit 114 may update the patch dictionary unit 113 according to patches related with the gaps or holes.

Figure 23:
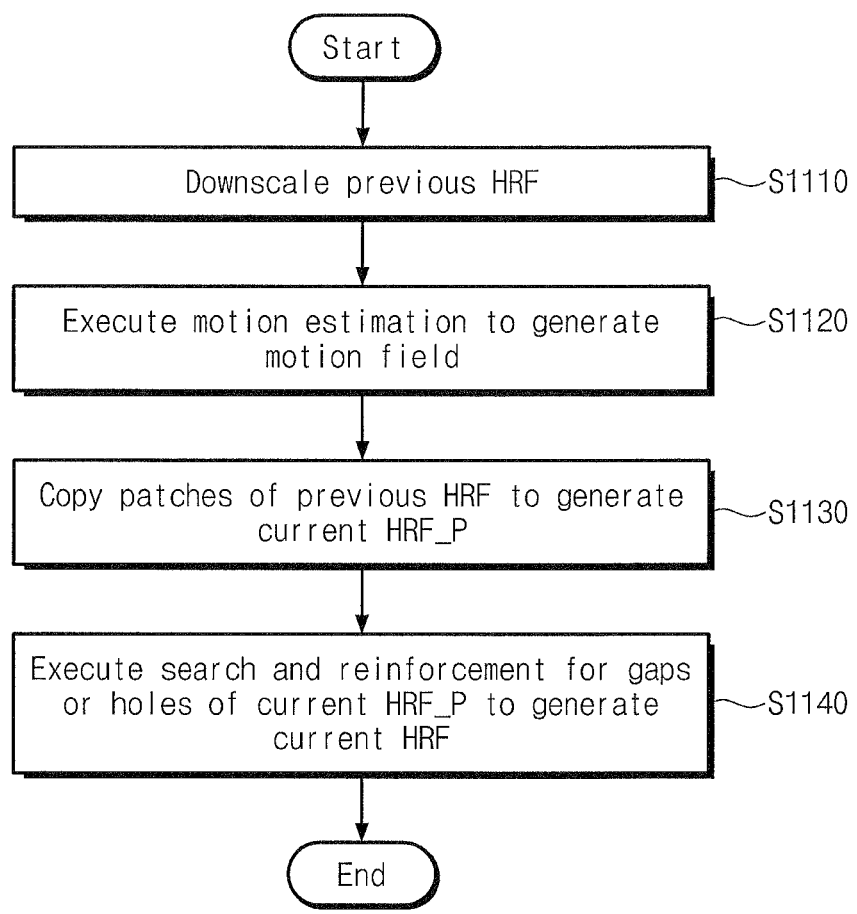
FIG. 23 is a flow chart illustrating an image processing method of the image processor of FIG. 22.

FIG. 23 is a flow chart illustrating an image processing method of an image processor 111b of FIG. 22. Referring to FIGS. 22 and 23, in step S1110, downscale on a previous output frame HRF may be executed.

In step S1120, a motion may be detected based on a current input frame LRF and a previous output frame HRF, and a motion field may be generated.

In step S1130, a partial upscaled frame HRF_P is generated by copying patches of the previous output frame HRF.

In step S1140, searching and reinforcing of high frequency components on gaps or holes of the partial upscaled frame HRF_P, and a current output frame HRF are generated.

In exemplary embodiments, when a patch corresponding to a gap or a hole is not searched for in a patch dictionary unit 113, reinforcement on the gap or hole may be made according to in-painting.

Figure 24:
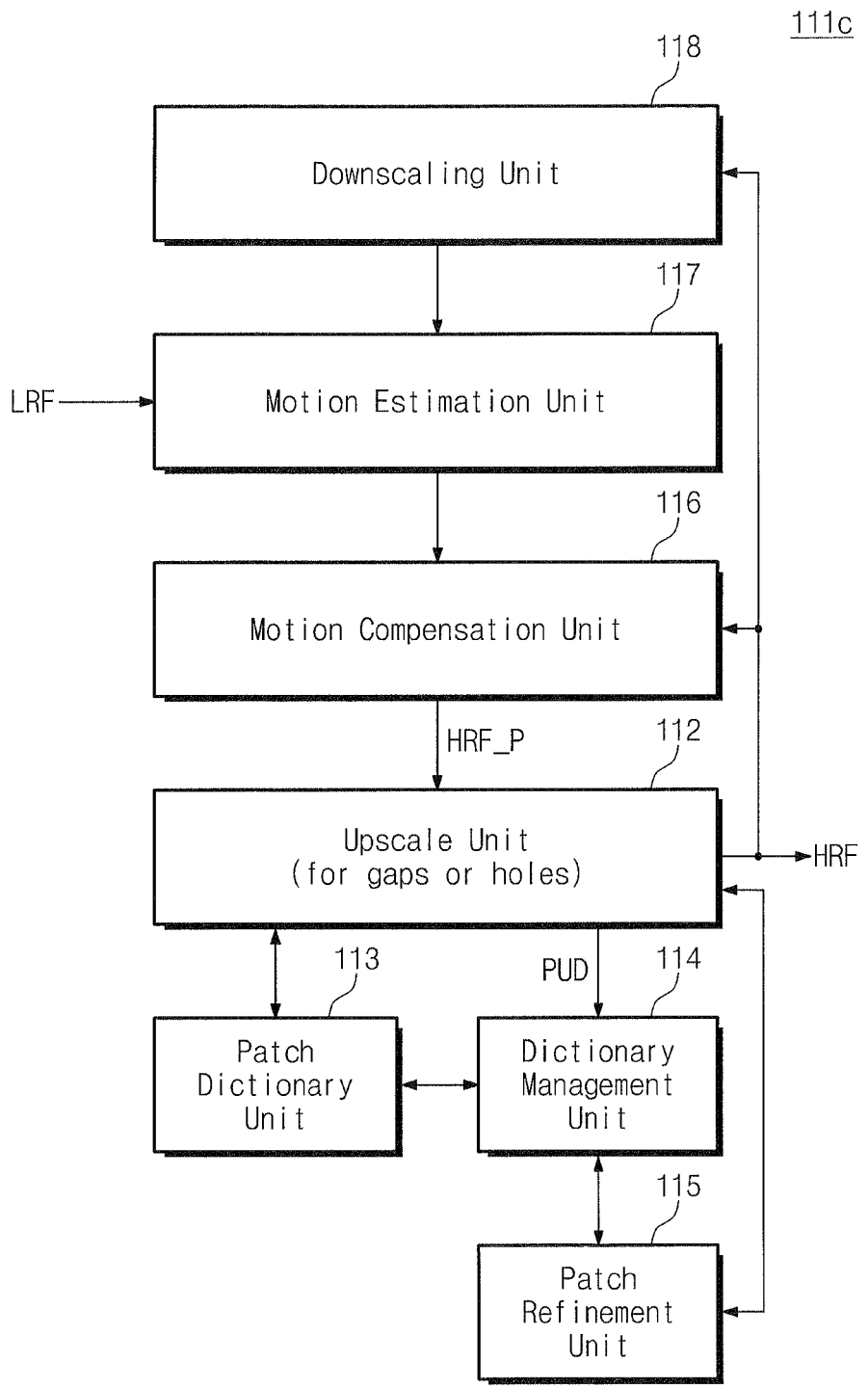
FIG. 24 is a block diagram schematically illustrating an image processor according to an embodiment of the inventive concept.

FIG. 24 is a block diagram schematically illustrating an image processor 111c according to an embodiment of the inventive concept. Referring to FIG. 24, an image processor 111c includes an upscale unit 112, a patch dictionary unit 113, a dictionary management unit 114, a patch refinement unit 115, a motion compensation unit 116, a motion estimation unit 117, and a downscale unit 118. Compared with an image processor 111b of FIG. 22, the image processor 111c may further include the patch refinement unit 115.

In the image processor 111c, as described with reference to FIGS. 22 and 23, a partial upscaled frame HRF_P may be generated.

Refinement on the partial upscaled frame HRF_P may be executed referring to the patch dictionary unit 113 as described with reference to FIGS. 16 to 21.

The upscale unit 112 modifies patches of gaps or holes of the partial upscaled frame HRF_P using the patch refinement unit 115. The dictionary management unit 114 updates the patch dictionary unit 113 according to patches related with the refinement.

Figure 25:
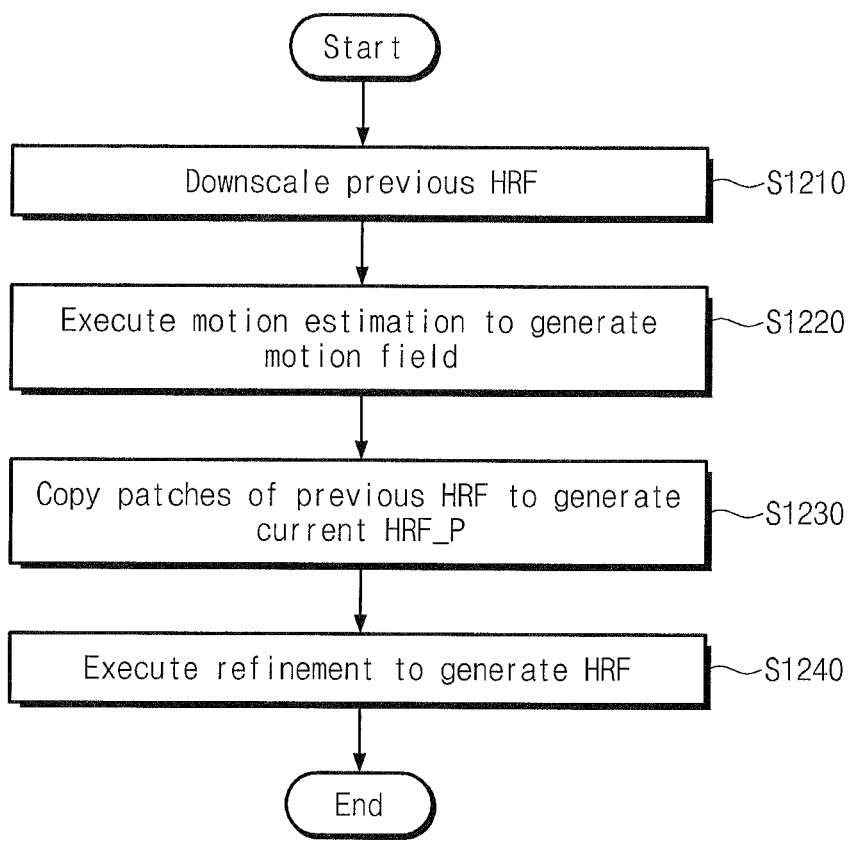
FIG. 25 is a flow chart illustrating an image processing method of the image processor of FIG. 24.

FIG. 25 is a flow chart illustrating an image processing method of the image processor of FIG. 24. Referring to FIGS. 24 and 25, in step S1210, downscale on a previous output frame HRF is executed.

In step S1220, a motion may be detected based on a current input frame LRF and a previous output frame HRF, and a corresponding motion field is generated.

In step S1230, a partial upscaled frame HRF_P is generated by copying patches of the previous output frame HRF.

In step S1240, refinement on the partial upscaled frame HRF_P may be performed referring to a patch dictionary unit 113, and a current output frame HRF may be generated. The whole of the partial upscaled frame HRF_P may be refined.

FIG. 26 is a flow chart illustrating an image processing method of an image processor 111c of FIG. 24 according to an embodiment of the inventive concept. Referring to FIGS. 24 and 26, in step S1310, the predetermined number (n) of frames may be accumulated.

In step S1320, refinement may be executed using the accumulated frames.

In step S1330, the refined frames may be sequentially output as an output frame HRF.

In step S1340, downscale on a previous output frame HRF may be executed.

In step S1350, a motion may be detected based on a current input frame LRF and a previous output frame HRF, and a motion field may be generated.

In step S1360, a partial upscaled frame HRF_P is generated by copying patches of the previous output frame HRF.

In step S1370, refinement on gaps or holes of the partial upscaled frame HRF_P is performed, and a current output frame HRF is generated.

Steps S1340 to S1370 may be repeated after steps S1310 to S1330 are performed. Thus, predetermined frames may be accumulated and refined. Motion estimation and motion compensation on the refined and accumulated frames may not be performed.

If accumulation and refinement are completed, motion estimation and motion compensation may be executed from a next frame. At this time, refinement may be additionally executed only with respect to holes or gaps of the partial upscaled frame HRF_P. Additional refinement may not be executed with respect to accumulated and refined frames. If refinement is executed only with respect to holes or gaps, coherency between a previous frame and a current frame may be maintained.

As described above, with embodiments of the inventive concept, upscale on a low-resolution input frame may be executed based on self-similarity and a patch dictionary unit 113. As upscale on frames is executed, the patch dictionary unit 113 may be reinforced. Thus, upscale accuracy may be improved and a noise may be reduced. A dictionary management unit 114 may manage the patch dictionary unit 113 such that the consumption of the capacity of the patch dictionary unit 113 does not increase excessively. Thus, although upscale is continuously executed, a resource taken by the patch dictionary unit 113 may be maintained within a predetermined range.

The patch dictionary unit 113 may be updated according to a process of a continuous video stream in an on-line manner or an on-the-fly manner. The patch dictionary unit 113 may utilize coherency between frames by updating patches based on frames of a continuous video stream. As coherency between frames by updating patches is utilized, the quality of upscale may be maintained highly. Also, it is possible to maintain the capacity of the patch dictionary unit 113 to be suitable for a low-resource device such as a mobile device.

In exemplary embodiments, when an image processor 111 starts to upscale frames, the patch dictionary unit 113 may not store patches or may store baseline patches. At this time, reinforcement on a high frequency component of an output frame HRF may not be sufficiently executed. Also, a noise of the output frame HRF may not be sufficiently removed.

When frames are acquired using a capture device such as a camera, a pre-step such as view finding may be performed. Also, when input frames are displayed, a pre-step such as framing may be performed. During the pre-operation, learning of the patch dictionary unit 113 may be made. Thus, during the pre-operation, patches may be added to the patch dictionary unit 113. Frames displayed after the pre-operation may be processed by the patch dictionary unit 113 reinforced.

Thus, reinforcement on an output frame HRF and removing of a noise can be sufficiently executed.

In exemplary embodiments, an input frame LRF may include a contents-rich area and a contents-less area. The contents-rich area may be processed based on self-similarity and the patch dictionary unit 113 according to embodiments of the inventive concept while the contents-less area may be upscaled using a simple algorithm such as bilinear or bicubic. For example, in a magnified frame MF, the contents-less area may be ignored, and high frequency components of the contents-rich area may be reinforced.

In exemplary embodiments, the patch size may be decided to optimize an operating performance of the image processor 111. For example, the patch size on specific frames may be changed and upscale may be executed. A patch size having the highest operating performance may be selected according to an upscale result.

In the above-described embodiments, various threshold values, reference values, or predetermined values may be mentioned. The threshold values, reference values, or predetermined values may be values which are decided according to algorithms and a design rule applied to the image processor 111 or constituent elements of the image processor 111.

Embodiments of the inventive concept may be applied to various devices which capture frames to store or display the captured frames. For example, embodiments of the inventive concept may be applied to devices such as a camera, a smart phone, a smart pad, a smart camera, and so on. In particular, embodiments of the inventive concept may be applied to devices which display high-resolution frames using a low-resolution camera and support an optical zoom.

Embodiments of the inventive concept may be applied to devices which receive and display frames. For example, embodiments of the inventive concept may be applied to devices such as a smart phone, a smart pad, a smart camera, a notebook computer, a desktop computer, a smart television, and so on. In particular, the embodiments of the inventive concept may be applied to devices which receive low-resolution frames to display high-resolution frames.

With embodiments of the inventive concept, upscale on an input image may be executed referring to patches stored in a patch dictionary unit. Patches stored in the patch dictionary unit may be updated according an upscale result. Thus, it is possible to acquire high-quality images from low-quality images with the improved reliability and accuracy.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An image processing method of an image processor comprising:
   storing a plurality of patches being frame fragments, the size of each frame fragment being smaller than that of a frame;
   upscaling an input frame based on a patch dictionary unit;
   updating the patch dictionary unit according to an upscale result,
   wherein while upscaling of the input frame, a high frequency component of the upscaled input frame is reinforced based on the patch dictionary unit, and
   wherein the updating the patch dictionary according to an upscale result comprises:
      adding frequently-visible similar patches in the upscaled input frame to the patch dictionary unit;
      aggregating high-frequency and low-noise information associated with a plurality of patches in the patch dictionary unit; and
      removing less-observed patches in the upscaled input frame from the patch dictionary unit.

2. The image processing method of claim 1, wherein the patch dictionary unit is updated based on at least one patch used for performing the upscaling.

3. The image processing method of claim 1,
   wherein the upscaling an input frame comprises:
      selecting a magnified patch of the upscaled input frame;
      detecting a descriptor indicating a low frequency component of the magnified patch from the magnified patch;
      searching for a first patch in a relevant area of the input frame based on the descriptor;
      searching for a second patch in the patch dictionary unit based on the descriptor, and
      modifying the magnified patch using one, closer to the magnified patch, from among the first and second patches.

4. The image processing method of claim 3, wherein the updating the patch dictionary unit according to an upscale result comprises:
   calculating the difference between the first patch and the second patch;
   replacing the second patch stored in the patch dictionary unit with the first patch if the calculated difference is less than a threshold value;
   determining whether the difference between the first patch and the magnified patch is less than the difference between the second patch and the magnified patch, if the calculated difference is not less than a threshold value;
   adding the first patch to the patch dictionary unit if the first patch is closer to the magnified patch than the second patch; and
   ignoring the first patch if the difference between the first patch and the magnified patch is not less than the difference between the second patch and the magnified patch.

5. The image processing method of claim 4, wherein the updating the patch dictionary unit according to an upscale result further comprises:
   increasing a score of a patch, used at the upscaling, from among patches stored in the patch dictionary unit;
   assigning a predetermined score to a new patch if the new patch is added to the patch dictionary unit; and
   decreasing the scores of patches stored in the patch dictionary unit if the predetermined number of search operations is executed at the patch dictionary unit.

6. The image processing method of claim 5, wherein the updating the patch dictionary unit according to an upscale result further comprises: after the scores are decreased, deleting a patch having a score lower than a threshold value from among patches stored in the patch dictionary unit.

7. The image processing method of claim 5, wherein the updating the patch dictionary unit according to an upscale result further comprises: if the size of the patch dictionary unit reaches a predetermined limit value upon adding of a new patch to the patch dictionary unit, deleting a patch having a score lower than a threshold value from among patches stored in the patch dictionary unit.

8. The image processing method of claim 4, wherein the updating the patch dictionary unit according to an upscale result further comprises: if the number of the similar patches similar to the new patch, from among patches stored in the patch dictionary unit is larger than a threshold value upon adding of the new patch to the patch dictionary unit, then combining the new patch and the similar patches.

9. The image processing method of claim 1, wherein if the patch dictionary unit is initialized. remaining patches other than baseline patches are deleted from the patch dictionary unit.

10. The image processing method of claim 1,
wherein the upscaling an input frame comprises:
selecting a magnified patch of the upscaled input frame;
searching in a relevant area of the upscaled input frame for at least one first patch similar to the magnified patch;
searching in the patch dictionary unit for a second patch similar to the magnified patch;
executing refinement using the at least one first patch and the second patch; and
replacing the magnified patch with the refined patch.

11. The image processing method of claim 10, wherein the updating the patch dictionary unit according to an upscale result comprises:
if the second patch is searched for in the patch dictionary unit then increasing a score of the second patch;
adding the at least one first patch to the patch dictionary unit with a first initial score if the second patch is not searched for in the patch dictionary unit and the at least one first patch is searched for; and
adding the magnified patch to the patch dictionary unit with a second initial score smaller than the first initial score if the second patch is not searched for in the patch dictionary unit and the at least one first patch is not searched for.

12. The image processing method of claim 1, further comprising:
downscaling a previous frame upscaled;
generating a motion field by performing motion detection on the downscaled frame and the input frame; and
generating a upscaled partial frame by copying patches of the previous frame upscaled, based on the motion field, wherein the upscaling is executed with respect to the upscaled partial frame.

13. The image processing method of claim 1, wherein the upscaling an input frame based on a patch dictionary unit comprises: upscaling or noise-reducing the input frame using the high-frequency and low-noise information that have been collected from a plurality of previous input frames.

14. An image processor comprising:
a patch dictionary unit for storing a plurality of patches being frame fragments, the size of each frame fragment being smaller than the size of a frame;
an upscale unit configured to receive an input frame, to upscale the input frame, and to search or patches of the upscaled input frame and of the patch dictionary unit;
a dictionary management unit configured to update the patch dictionary unit, and a patch refinement unit configured to execute refinement of a patch of the upscaled input frame and a patch of the patch dictionary unit searched for by the upscale unit,
wherein the upscale unit executes an upscale on the input frame using the refined patches and the dictionary management unit updates the patch dictionary based on the refined patches.

15. The image processor of claim 14, further comprising:
a downscale unit configured to downscale an output frame of the upscale unit;
a motion estimation unit configured to perform motion estimation using a frame downscaled by the downscale unit and an initial input frame; and
a motion compensation unit configured to generate a upscaled partial frame by copying patches of the output frame based on a motion field estimated by the motion estimation unit, the upscaled partial frame being sent to the upscale unit as the input frame.

16. An image processor comprising:
a motion estimation unit configured to perform motion estimation using a first upscaled-then-downscaled frame output by a downscale unit and an. upscale unit and second initial input frame; and
a motion compensation unit configured to generate a partial frame by copying patches of the first upscaled-then-downscaled frame based on a motion field estimated by the motion estimation unit, the partial frame being sent to the upscale unit.

17. The image processor of claim 16, further comprising:
the upscale unit configured to receive a first input frame, to upscale the first input frame, and to reinforce a high frequency component of the upscaled first input frame using patches of the upscaled first input frame and patches stored in a patch dictionary unit; and
the downscale unit configured to downscale the upscaled first input frame output by the upscale unit, and to output the first upscaled-then-downscaled frame.

18. The image processor of claim 16, further comprising:
a patch dictionary unit for storing a plurality of patches being frame fragments, the size of each frame fragment being smaller than the size of a frame;
the upscale unit configured to receive a first input frame, to upscale the first input frame and to search for patches of the upscaled first input frame and of the patch dictionary unit;
a dictionary management unit configured to update the patch dictionary unit; and
a patch refinement unit configured to execute refinement of a patch of the upscaled first input frame and a patch of the patch dictionary unit searched for by the upscale unit, and
wherein the upscale unit executes an upscale on the first input frame using the refined patches and the dictionary management unit updates the patch dictionary unit based on the refined patches.

* * * * *